(12) United States Patent
Gomez et al.

(10) Patent No.: US 9,742,509 B2
(45) Date of Patent: Aug. 22, 2017

(54) APPARATUS AND METHOD IN RADIO COMMUNICATIONS SYSTEM

(71) Applicants: SONY CORPORATION, Tokyo (JP); TSINGHUA UNIVERSITY, Beijing (CN)

(72) Inventors: Jean-Sebastien Ernest Arturo Gomez, Beijing (CN); Bo Bai, Beijing (CN); Wei Chen, Beijing (CN); Zhigang Cao, Beijing (CN); Xin Guo, Beijing (CN)

(73) Assignees: Sony Corporation, Tokyo (JP); Tsinghua University, Beijing (CN)

( * ) Notice: Subject to any disclaimer, the term of this patent is extended or adjusted under 35 U.S.C. 154(b) by 164 days.

(21) Appl. No.: 14/773,647

(22) PCT Filed: Dec. 26, 2013

(86) PCT No.: PCT/CN2013/090556
§ 371 (c)(1),
(2) Date: Sep. 8, 2015

(87) PCT Pub. No.: WO2014/139308
PCT Pub. Date: Sep. 18, 2014

(65) Prior Publication Data
US 2016/0028499 A1    Jan. 28, 2016

(30) Foreign Application Priority Data
Mar. 15, 2013    (CN) .......................... 2013 1 0082767

(51) Int. Cl.
*H04L 1/00* (2006.01)
*H04B 17/318* (2015.01)
(Continued)

(52) U.S. Cl.
CPC ........... *H04B 17/318* (2015.01); *H04L 43/04* (2013.01); *H04W 24/08* (2013.01)

(58) Field of Classification Search
CPC .................................................... H04B 17/318
(Continued)

(56) References Cited

U.S. PATENT DOCUMENTS

2008/0076447 A1\* 3/2008 Duxbury ............... H04W 64/00
                                                      455/456.1
2010/0182972 A1    7/2010 Katayama et al.
(Continued)

FOREIGN PATENT DOCUMENTS

CN    101795455 A    8/2010
CN    101820671 A    9/2010
(Continued)

OTHER PUBLICATIONS

International Search Report issued on Mar. 27, 2014 for PCT/CN2013/090556 filed on Dec. 26, 2013.

*Primary Examiner* — Shripal Khajuria
(74) *Attorney, Agent, or Firm* — Oblon, McClelland, Maier & Neustadt, L.L.P.

(57) ABSTRACT

An apparatus and a method in a radio communications system. The apparatus in the radio communications system includes an estimation unit and a statistics collection unit. The estimation unit is used for estimating a signal receiving strength of each of multiple transmission positions, compared with a signal transmission strength of each of one or more possible transmission positions of a first-type node of a to-be-test communications system on a transmission resource block. The statistics collection unit is used for collecting, according the estimation result, statistics on power space distribution of the first-type node of the to-be-tested communications system.

19 Claims, 12 Drawing Sheets

(51) Int. Cl.
*H04W 24/08* (2009.01)
*H04L 12/26* (2006.01)

(58) Field of Classification Search
USPC .......................................... 370/252
See application file for complete search history.

(56) References Cited

U.S. PATENT DOCUMENTS

2012/0127934 A1 5/2012 Anderson et al.
2017/0086176 A1* 3/2017 Seo ........................... H04L 1/00

FOREIGN PATENT DOCUMENTS

| | | |
|---|---|---|
| CN | 102811455 A | 12/2012 |
| WO | WO 2012/062766 A1 | 5/2012 |
| WO | WO 2013/034023 A1 | 3/2013 |

* cited by examiner

APPARATUS AND METHOD IN RADIO COMMUNICATIONS SYSTEM

FIELD OF THE INVENTION

The present invention relates to the field of communications and in particular to a device and method in a radio communication system.

BACKGROUND OF THE INVENTION

In recent years, people's daily life, work and various other fields have become increasingly involved in the field of communications along with the constant development of communication technologies. Various electronic communication products capable of communication, e.g., mobile-phone, notebook computers, tablet computers, etc., have become common in our life.

In the field of communications, a communication scheme in which information is transmitted over a radio wave can be referred to as radio communication. At present, radio communication is becoming a hot field of researches.

SUMMARY OF THE INVENTION

The following presents a simplified summary of the invention in order to provide basic understanding of some aspects of the invention. It shall be appreciated that this summary is not an exhaustive overview of the invention. It is not intended to identify key or critical elements of the invention or to delineate the scope of the invention. Its sole purpose is to present some concepts in a simplified form as a prelude to the more detailed description that is discussed later.

According to an aspect of the invention, there is provided a device in a radio communication system, the device including: an estimating unit configured to estimate a received signal power strength, at each of a plurality of receive positions, of a transmission signal in a transmission resource block from each of one or more possible transmit positions of a first type of node in the communication system to be detected; and a statistic unit configured to make a statistic of a power space distribution of the first type of node in the communication system to be detected, according to a result of the estimation.

According to another aspect of the invention, there is provided another device in a radio communication system, the device including: an obtaining unit configured to obtain power strengths of a signal, of the communication system to be detected, in a transmission resource block to be detected, received on at least two receive positions; and a judging unit configured to judge a type of node corresponding to a node transmitting the signal in the transmission resource block to be detected, in the communication system to be detected, using a power space distribution model according to the power strengths of the signal, of the communication system to be detected, in the transmission resource block to be detected, wherein the power space distribution model reflects at least a statistic result of estimated received signal power strengths, at two of the receive positions, of a transmission signal in a transmission resource block from each of one or more possible transmit positions of the first type of node in the communication system to be detected.

According to another aspect of the invention, there is provided a method in a radio communication system, the method including: estimating a received signal power strength, at each of a plurality of receive positions, of a transmission signal in a transmission resource block from each of one or more possible transmit positions of a first type of node in the communication system to be detected; and making a statistic of a power space distribution of the first type of node in the communication system to be detected, according to a result of the estimation.

According to another aspect of the invention, there is provided another method in a radio communication system, the method including: obtaining power strengths of a signal, of the communication system to be detected, in a transmission resource block to be detected, received on at least two receive positions; and judging a type of node corresponding to a node transmitting the signal in the transmission resource block to be detected, in the communication system to be detected, using a power space distribution model according to the power strengths of the signal, of the communication system to be detected, in the transmission resource block to be detected, wherein the power space distribution model is constructed at least by making a statistic of estimated received signal power strengths, at two of the receive positions, of a transmission signal in a transmission resource block from each of one or more possible transmit positions of the first type of node in the communication system to be detected.

The methods and devices above in a radio communication system according to the embodiments of the invention can attain at least one of the following advantages: they can derive the power space distribution of the first type of node in the communication system to be detected, simply using a small number of transmission resource blocks to be detected. Thus the complexity in their processing can be lowered, and the operations thereof can be simplified and easy to perform, thus achieving high utility thereof; and the uplink or downlink state of the transmission resource block to be detected can be judged simply using a small number of transmission resource blocks to be detected.

These and other advantages of the invention will become more apparent from the following detailed description of preferred embodiments of the invention with the drawings.

BRIEF DESCRIPTION OF THE DRAWINGS

The invention can be better understood with reference to the detailed description given below in conjunction with the accompanying drawings throughout which identical or similar reference numerals denote identical or similar components. The drawings together with the following detailed description are incorporated into, and form a part, of this specification and serve to further illustrate preferred embodiments of the invention and to explain the principle and advantages of the invention. In the drawings.

Figure 1A:
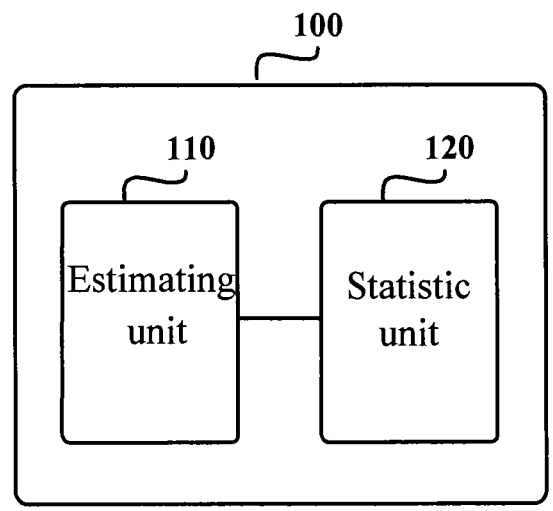
FIG. 1A is a block diagram schematically illustrating an exemplary structure of a device in a radio communication system according to an embodiment of the invention.

Those skilled in the art shall appreciate that the elements in the drawings are illustrated merely for the sake of conciseness and clarity and may not be drawn to scale. For example, sizes of some elements in the drawings may be magnified relative to the other elements to facilitate improved understanding of the embodiments of the invention.

DETAILED DESCRIPTION OF THE INVENTION

Exemplary embodiments of the invention will be described below with reference to the drawings. In the interest of clarity and conciseness, not all features of an actual implementation are described in this specification. However, it shall be appreciated that in the development of any such actual embodiment, numerous implementation-specific decisions shall be made to achieve the developers' specific goals, such as compliance with system-related and business-related constraints, which will vary from one implementation to another. Moreover, it shall be appreciated that such a development effort might be complex and time-consuming, but will nevertheless be a routine undertaking for those of ordinary skill in the art having the benefit of this disclosure.

It shall be further noted here that only device structures and/or process steps closely relevant to the solution according to the invention are illustrated in the drawings, but other details less relevant to the invention have been omitted, so as not to obscure the invention due to the unnecessary details.

An embodiment of the invention provides a device in a radio communication system, the device including: an estimating unit configured to estimate a received signal power strength, at each of a plurality of receive positions, of a transmission signal in a transmission resource block from each of one or more possible transmit positions of a first type of node in the communication system to be detected; and a statistic unit configured to make a statistic of a power space distribution of the first type of node in the communication system to be detected, according to a result of the estimation.

An example of the device in a radio communication system according to the embodiment of the invention (hereinafter a first example) will be described below in details with reference to FIG. 1A.

As illustrated in FIG. 1A, the device 100 in a radio communication system according to the embodiment of the invention includes an estimating unit 110 and a statistic unit 120.

For a certain communication system to be detected, e.g., a Primary System (PS) in a cognitive radio network, or another type of communication system, there are a plurality of receive positions assumed in a coverage area of the communication system to be detected, where for example, the plurality of receive positions can be positions where any one of a Secondary User (SU), an access point, a spectrum manager, etc., respectively arranged in the coverage area of the primary system (which is an example of the communication system to be detected) is located.

There are at least one type of nodes assumed in the communication system to be detected, e.g., at least a first type of nodes, where for example, the first type of nodes can be Primary Users (PUs) in the primary system (which is an example of the communication system to be detected) or another type of nodes, e.g., Primary Base Stations (PBSs), etc., in the primary system.

It shall be noted that if there are at least two types of nodes in the communication system to be detected, then the first type of nodes can be either of the at least two types of nodes.

For the sake of clarity, entities in a cognitive radio network will be introduced briefly here, where the primary system can refer to a system with an access to a spectrum, e.g., a TV and radio system, a mobile communication system to which spectrum resources are allocated, etc.; and the secondary system refers to a system, without an access to a spectrum, which can access a spectrum possessed by the primary system appropriately only if the spectrum is not being accessed by the primary system. Moreover both the primary system and the secondary system here can alternatively be systems with an access to a spectrum, but will access the spectrum at different priorities. For example, if an operator deploys a new base station to provide a new service, then an existing base station, and a service provided by the existing base station have a priority to access the spectrum. A base station in the primary system will be referred to as a primary base station, and a user if the primary system will be referred to as a primary user. A base station in the secondary system will be referred to as a Secondary Base Station (SBS), and a user in the secondary system will be referred to as a secondary user. For example, if the primary system is a digital TV and radio system, then the secondary system can access dynamically a spectrum of some channel over which no program is played, or a spectrum of an adjacent channel, for mobile radio communication without any interference to reception of a TV signal.

Moreover it shall be further noted that if there are at least two types of nodes in the communication system to be detected, then transmit power of the respective types of nodes will be different from each other. In other words, nodes with different transmit power can be categorized into different types of nodes, and there is the same or similar transmit power of the same type of nodes. By way of an example, there are different distances of two users served by the same base station from the base station, so there are different signal transmit power levels of the users, where these two users can be categorized respectively into a first type of node and a second type of node. Those skilled in the art can set the difference in transmit power between the different types of nodes as required in reality for the precision of a result, and a repeated description thereof will be omitted here.

Thus in the device 100, for each of the plurality of receive positions, the estimating unit 110 estimates the received signal power strength, at the position, of the transmission signal in the transmission Resource Block (RB) from each of the one or more possible transmit positions of the first type of node in the communication system to be detected.

Here the possible transmit positions of the first type of node refer to positions where the first type of node may possibly be distributed in the communication system to be detected but may not necessarily be positions where the first type of node is distributed in reality. Generally if the number of possible transmit positions for selection is larger, then a result of subsequent calculation will be more accurate at the cost of an accompanying increase in complexity. The number of possible transmit positions can be determined empirically or experimentally and/or as required in reality.

Moreover there are typically a large number of possible transmit positions of the first type of node, and one or more positions can be selected randomly or uniformly in the coverage area of the communication system to be detected as the one or more possible transmit positions of the first type of node.

For example, if there are two receive positions which are positions respectively where a secondary user is located in the coverage area of the communication system to be detected, then the two positions where the secondary user is located will be represented below respectively as SU1 and SU2.

Moreover five of the plurality of possible transmit positions of the first type of node are represented respectively as PU1, PU2, PU3, PU4, and PU5.

Then the estimating unit 110 estimates the received signal power strength, at the SU1, of the transmission signal in a single transmission resource block from the PU1 as $P_R(1,1)$, and the received signal power strengths, at the SU1, of the transmission signals in the single transmission resource block from the other respective PU2, PU3, PU4, and PU5 respectively as $P_R(1,2)$, $P_R(1,3)$, $P_R(1,4)$, and $P_R(1,5)$.

Similarly the estimating unit 110 estimates the received signal power strengths, at the SU2, of the transmission signal in the single transmission resource block from the respective PU1, PU2, PU3, PU4, and PU5 respectively as $P_R(2,1)$, $P_R(2,2)$, $P_R(2,3)$, $P_R(2,4)$, and $P_R(2,5)$.

For the PU1, the received signal power strengths corresponding to the SU1 and the SU2 are $P_R(1,1)$ and $P_R(2,1)$ respectively, so "$P_R(1,1)$, $P_R(2,1)$" can represent a set of received signal power strengths at the possible transmit position. It shall be noted that if there are more than two receive positions, then for each of the possible transmit positions of the first type of node, the receive signal power strengths, at the respective receive positions, corresponding to the possible transmit position are a set of receive signal power strengths. For example, for the possible transmit position PU1 of the first type of node, a set of received signal power strengths corresponding to $N_{SU}$ receive positions can be represented as "$P_R(1,1)$, $P_R(2,1)$, . . . , $P_R(N_{SU},1)$", a repeated description thereof will be omitted here.

Here the set of received signal power strengths, at the SU1 and the SU2, corresponding to the single transmission resource block corresponds to only one of the possible transmit positions of the first type of node, for example, "$P_R(1,1)$, $P_R(2,1)$" corresponds to only the PU1, "$P_R(1,2)$, $P_R(2,2)$" corresponds to only the PU2, etc.

In another implementation, if more than one transmission resource block is allocated to each of the possible transmit positions of the first type of node, then more than one of the transmission resource blocks can be selected, and a process similar to the process performed for the single transmission resource block can be performed for each of the selected transmission resource blocks to obtain results of estimation for the more than one transmission resource block.

In an example, the received signal power strength can be calculated in Equation 1 below:

$$P_R(i,j)=10^{(P_{T/RB}-PL(D_{i,j}))*10^{-1}};\qquad \text{Equation 1:}$$

Where $P_R(i, j)$ represents the received signal power strength in watt, at the i-th secondary user SUi (which is an example of the i-th receive position), of a transmission signal in a single transmission resource block $RB_0$ from the j-th possible transmit position of the first type of node, where i=1,2, . . . , $N_{SU}$, and $N_{SU}$ represents the number of secondary users (which are an example of the receive positions); and j=1, 2, . . . , N, and N represents the number of possible transmit positions of the first type of node. Here the values of $N_{SU}$ and N can be preset empirically or experimentally. For example, $N_{SU}$ and N can be preset to as large values as possible if this is allowed under a condition, so that there will be a better effect of subsequent processing, that is, the statistic unit 120 can derive a more accurate power space distribution.

Where $P_{T/RB}$ represents transmit power allocated by the first type of node onto each transmission resource block. For example, transmit power allocated by the primary base station (which is an example of the first type of node) onto each transmission resource block is 26 dBm. In another example, transmit power allocated by the primary user (which is an example of the first type of node) onto each transmission resource block can be calculated, for example, in Equation 2 below:

$$P_{T/RB}=\min(P_{max}-10\ \log_{10}(N^{RB}), PL(D_{i,j})-105);\qquad \text{Equation 2:}$$

Where $P_{max}$ represents maximum transmit power of the first type of node. For example, for the primary user (which is an example of the first type of node), $P_{max}$ can be 23 dBm.

$N^{RB}$ represents the number of transmission resource blocks allocated to each first type of node. In an embodiment of the invention, $N^{RB}$ can be preset to 1 to derive the received signal power strength of the transmission signal in the single transmission resource block $RB_0$.

$PL(D_{i,j})$ represents a path loss in dBm, where $PL(D_{i,j})$ can be calculated, for example, in Equation 3 below:

$$PL(D_{i,j})=128.1+37.5\ \log_{10}(D_{i,j}).\qquad \text{Equation 3:}$$

Where $D_{i,j}$ represents the distance in km between the i-th receive position (e.g., the i-th secondary user $SU_i$), and the j-th possible transmit position of the first type of node.

Moreover in another example, the received signal power strength can alternatively be calculated in Equation 4 below:

$$P_R(i,j)=10^{(PT/RB-PL(D_{i,j}))*10^{-1}}+N(0,1)*10^{-Pnoise/RB*10^{-1}};\quad \text{Equation 4:}$$

Where $P_{noise/RB}$ represents noise power allocated in a single transmission resource block, e.g., approximately −121.4 dBm, and N(0,1) represents a Gaussian distribution (i.e., a standard normal distribution).

Moreover in another embodiment of the invention, the received signal power strength can alternatively be calculated in another equation than Equations 1 and 4 above, for example, some equation in the prior art, in which the received signal power strength is calculated, in compliance with the 3GPP TR36.814 or 3GPP TR 36.942 specification.

Thus the statistic unit 120 can derive the power space distribution of the first type of node in the communication system to be detected, according to the result of estimation by the estimating unit 110.

The power space distribution reflects a distribution of a set of received signal power strengths corresponding to each of the possible transmit positions, where the power space here refers to a multi-dimension power space corresponding to the received signal power at the plurality of receive positions. For example, if there are only two receive positions SU1 and SU2, then the power space is a two-dimension space; and if there are $N_{SU}$ (for example, $N_{SU}$ is more than 2) receive positions, then the power space is a $N_{SU}$-dimension space.

Figure 1B:
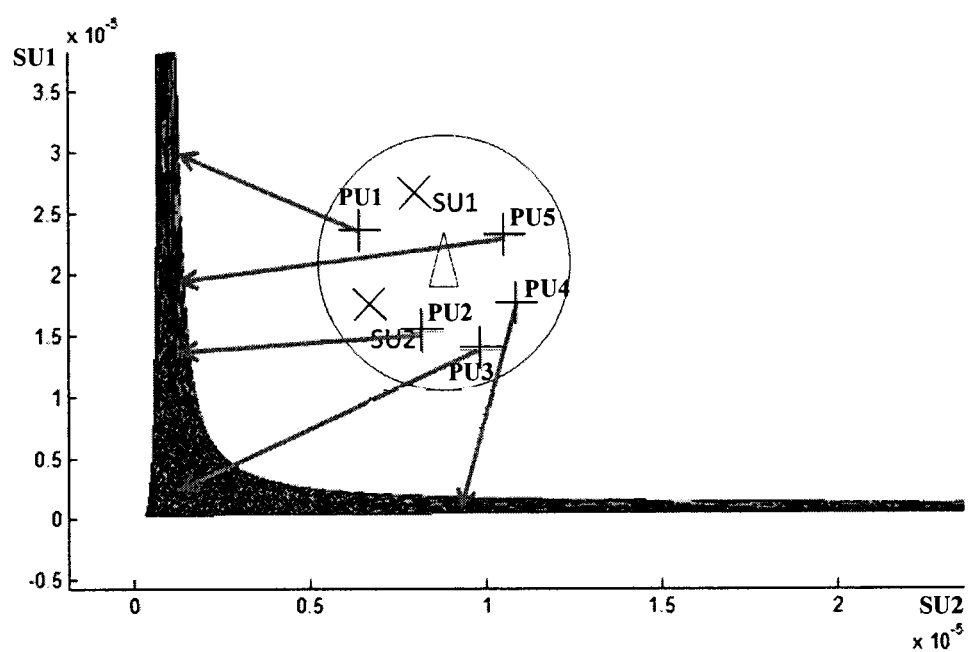
FIG. 1B is a diagram schematically illustrating an example of a power space distribution of a first type of node in the case that only one transmission resource block is allocated to each of possible transmit positions of the first type of node.

FIG. 1B illustrates an example of the power space distribution of the first type of node in the case that only one transmission resource block is allocated to each of the possible transmit positions of the first type of node, where the ordinate in FIG. 1B represents the received signal power strength, estimated by the estimating unit 110, at the SU1, of the transmit power in the transmission resource block from each of the possible transmit positions of the first type of node, and the abscissa represents the received signal power strength, estimated by the estimating unit 110, at the SU2, of the transmit signal in the transmission resource block from each of the possible transmit positions of the first type of node. "+" in FIG. 1B represents a possible transmit position of the first type of node, and "x" represents a position where a secondary user is located (which is an example of the receive position).

As can be apparent from the description above, the device above in a radio communication system according to the embodiment of the invention can derive the power space distribution of the first type of node in the communication system to be detected, simply using a small number of (e.g., one) transmission resource blocks to be detected. Thus the complexity in processing by the device can be lowered, and the operations thereof can be simplified and easy to perform, thus achieving high utility thereof.

Moreover in another example of the device in a radio communication system according to the embodiment of the invention (hereinafter a second example), the estimating unit 110 can be further configured to estimate a received signal power strength, at each of the plurality of receive positions, of the transmission signal in the transmission resource block from each of one or more possible transmit positions of each of further types of nodes in the communication system to be detected, in addition to the received signal power strength, at each of the plurality of receive positions, of the transmission signal in the transmission resource block from each of the one or more possible transmit positions of the first type of node in the communication system to be detected. Thus in the second example, the statistic unit 120 can be further configured to make a statistic of power space distributions of the further types of nodes in addition to the power space distribution of the first type of node in the communication system to be detected, where signal transmit power strength levels of the respective types of nodes are different from each other.

It shall be noted that an estimation process for each of the further types of nodes can be similar to the estimation process for the first type of node, and the power space distribution of each of the further types of nodes can be made a statistic of in a process similar to the process in which the power space distribution of the first type of node is derived while attaining similar technical effects, for example, a power space distribution similar to the power space distribution of the first type of node in FIG. 1B can be derived for each of the types of nodes, and a repeated description thereof will be omitted here.

Thus the power space distributions of the respective types of nodes can be derived and applicable to more scenarios with high precision of subsequent processing and high efficiency of processing.

Figure 2:
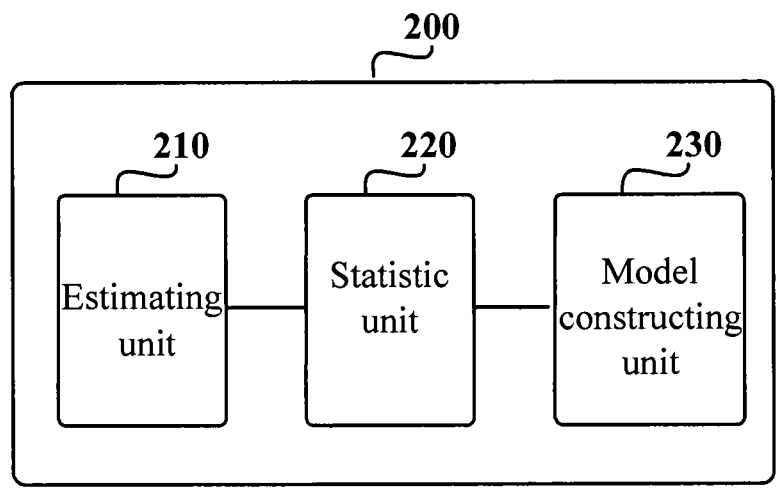
FIG. 2 is a block diagram schematically illustrating another exemplary structure of the device in a radio communication system according to the embodiment of the invention.

FIG. 2 schematically illustrates another example of the device in a radio communication system according to the embodiment of the invention (hereinafter a third example). In the third example, the device 200 in a radio communication system can further include a model constructing unit 230 in addition to an estimating unit 210 and a statistic unit 220.

The model constructing unit 230 is configured to construct a power space distribution model according to results derived by the estimating unit 210 and the statistic unit 220.

Here the power space distribution model reflects a statistic result of a signal power strength distribution in a multi-dimension power space corresponding to received power at the plurality of receive positions.

The estimating unit 210 and the statistic unit 220 in the device 200 can have the same structures and functions as the corresponding units in the device 100 in the first example or the second example described above in connection with FIG. 1A and achieve a similar technical effect, thus a repeated description thereof will be omitted here.

In an implementation, if the estimating unit 210 and the statistic unit 220 have the same structures and functions as the corresponding units in the first example described above in connection with FIG. 1A, then the model constructing unit 230 can construct the power space distribution model based upon the received signal power strengths, at the respective receive positions, from the respective possible transmit positions of the first type of node (the power space distribution model constructed in this case will be referred below to as a first class of model) to represent the statistic result of the power space distribution.

For example, the model constructing unit 230 can further construct the power space distribution model by constructing received power vectors corresponding to the respective possible transmit positions of the first type of node, where the received power vector reflect a set of received signal power strengths corresponding to the respective possible transmit position of the corresponding type of node (e.g., the first type of node described above or the second type of node to be described below or the like). For example, the set of received signal power strengths "$P_R(1,1)$, $P_R(2,1)$" corresponding to the possible transmit position PU1 of the first type of node can be represented in the form of a received power vector $\overline{E_{11}}=(P_R(1,1), P_R(2,1))$, the set of received signal power strengths "$P_R(1,2), P_R(2,2)$" corresponding to the possible transmit position PU2 of the first type of node can be represented in the form of a received power vector $\overline{E_{12}}=(P_R(1,2), P_R(2,2))$, and so on. Thus each of the possible transmit positions of the first type of node corresponds respectively to one received power vector, and the plurality of received power vectors corresponding to the respective possible transmit positions of the first type of node can constitute the power space distribution model (here the first class of model).

In another implementation, if the estimating unit 210 and the statistic unit 220 have the same structures and functions as the corresponding units in the second example described above in connection with FIG. 1A, then the model constructing unit 230 can construct the power space distribution model based upon the received signal power strengths, at the respective receive positions, from the respective possible transmit positions of the first type of node and the other types of nodes (the power space distribution model constructed in this case will be referred below to as a second class of model) to represent the statistic result of the power space distribution.

Similarly the model constructing unit 230 can further construct the power space distribution model by constructing received power vectors corresponding to the respective possible transmit positions of the first type of node and the other types of nodes, where the received power vectors can be constructed in a process similar to the process described above, thus a repeated description thereof will be omitted here.

Here in the second class of model, each of the possible transmit positions of each of the first type of node and the other types of nodes also corresponds respectively to one received power vector, where there is a signal transmit power strength level respectively of each of the types of nodes above, and the signal transmit power strength levels of the different types of nodes are different from each other.

In a real application, the power space distribution model constructed by the model constructing unit 230 can be widely applied to facilitate subsequent use and processing. For example, the type of a node to be detected can be judged using the model, a transmission state of a resource block to be detected can be judged using the model, etc.

Subsequently, the constructed power space distribution model can be stored in a predetermined device and then invoked for use each time instead of reconstructing the power space distribution model each time, to thereby improve the efficiency of processing and improving the performance of the device.

Figure 3:
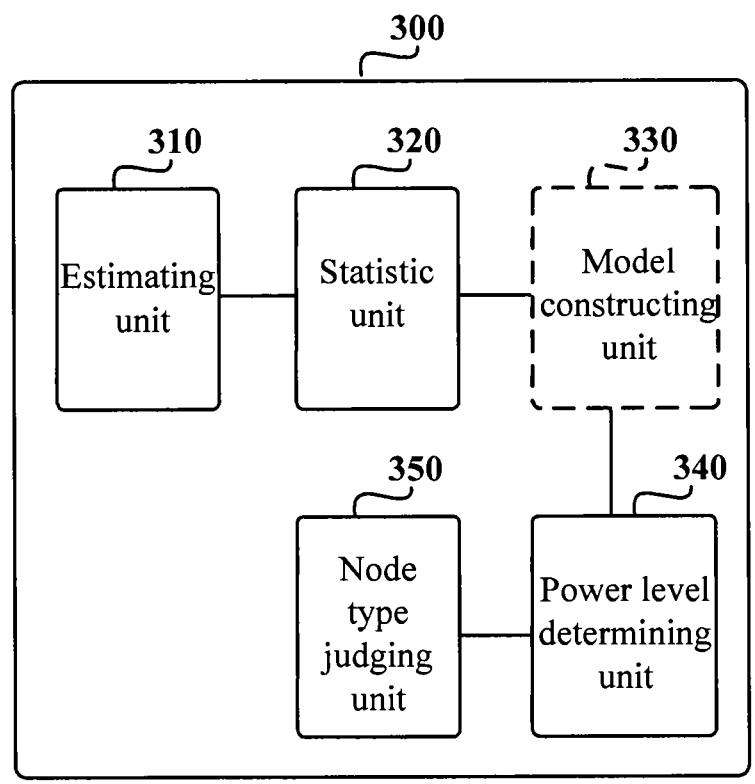
FIG. 3 is a block diagram schematically illustrating a further exemplary structure of the device in a radio communication system according to the embodiment of the invention.

FIG. 3 schematically illustrates a further example of the device in a radio communication system according to the embodiment of the invention (hereinafter a fourth example). In the fourth example, the device 300 in a radio communication system can further include a power level determining unit 340 and a node type judging unit 350 in addition to an estimating unit 310 and a statistic unit 320, where for example, the estimating unit 310 and the statistic unit 320 in the device 300 can have the same structures and functions as the corresponding units in the device 100 described above in connection with FIG. 1A while attaining similar technical effects, thus a repeated description thereof will be omitted here.

The power level determining unit 340 can determine a power level of a signal transmitted in a transmission resource block to be detected, from a power strength or strengths of the signal, received at one or more of the plurality of receive positions, transmitted in the transmission resource block to be detected, using the power space distribution model.

The plurality of receive positions mentioned here are the plurality of receive positions above in the coverage area of the communication system to be detected, e.g., the positions SU1 and SU2 where the plurality of secondary users are located in the primary system. Thus "the power strength or strengths of the signal, received at the one or more of the plurality of receive positions, transmitted in the transmission resource block to be detected" can include, for example, a power strength $P_{su1}$ of a signal $Sig_{su1}$, received at the SU1, transmitted in the transmission resource block to be detected, and a power strength $P_{su2}$ of a signal $Sig_{su2}$, received at the SU2, transmitted in the transmission resource block to be detected.

In some implementations, the power space distribution model used by the power level determining unit 340 can be pre-stored in the device 30.

In some further implementations, if the device 300 includes the model constructing unit 330, then the power space distribution model can alternatively be constructed by the model constructing unit 330, where for example, the model constructing unit 330 can have the same structures and functions as the model constructing unit 230 in the device 200 described above in connection with FIG. 2 while attaining similar technical effects, thus a repeated description thereof will be omitted here.

Figure 4:
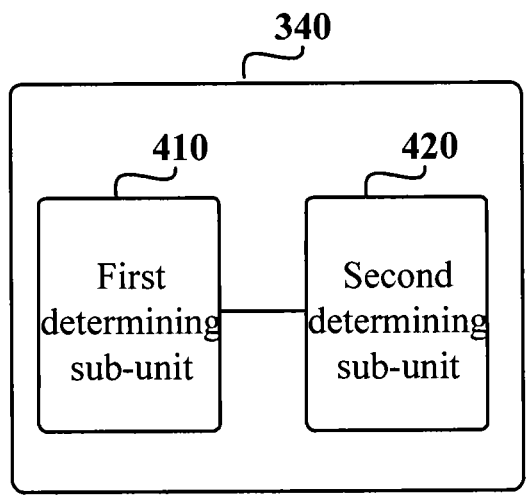
FIG. 4 is a block diagram schematically illustrating a possible exemplary structure of a power level determining unit as illustrated in FIG. 3.

FIG. 4 illustrates a possible exemplary structure of the power level determining unit 340. As illustrated in FIG. 4, the power level determining unit 340 can include a first determining sub-unit 410 and a second determining sub-unit 420.

The first determining sub-unit 410 can determine a distribution area corresponding to each of the power strength levels in the power space distribution model.

Here the power strength level of each of the types of nodes in the power space distribution model is predetermined. For each of the power strength levels, each of respective possible positions of the type of node corresponding to the power strength level only corresponds to a set of received signal power strengths, at the plurality of receive positions, corresponding to the single transmission resource block. Thus the set of received signal power strengths corresponding to each of the power strength levels includes all the received signal power strengths or sets of received signal power strengths corresponding to the type of node corresponding to the power strength level.

Thus for each of the power strength levels, the first determining sub-unit 410 can determine the distribution area corresponding to the power strength level according to distribution conditions, in the power space distribution model, of the respective sets of received signal power strengths corresponding to the power strength level.

In an implementation, the first determining sub-unit 410 can derive a power space distribution envelope, respectively of each of the types of nodes, in the power space distribution model to determine the distribution area corresponding to each of the power strength levels according to the envelopes. For example, for each of the types of nodes, the set of received signal power strengths corresponding to each of the possible positions of the type of node can be determined respectively as a received power vector, and then edges of distribution areas, in the power space, of endpoints of the respective received power vectors corresponding to the respective possible positions of the type of node can be determined as the envelope corresponding to the type of node, and an area inside the envelope (i.e., an area including the endpoints of the received power vectors) can be determined as the distribution area corresponding to the power strength level of the type of node. Moreover the envelope can alternatively be derived otherwise as in the prior art, a repeated description thereof will be omitted here.

Figure 5:
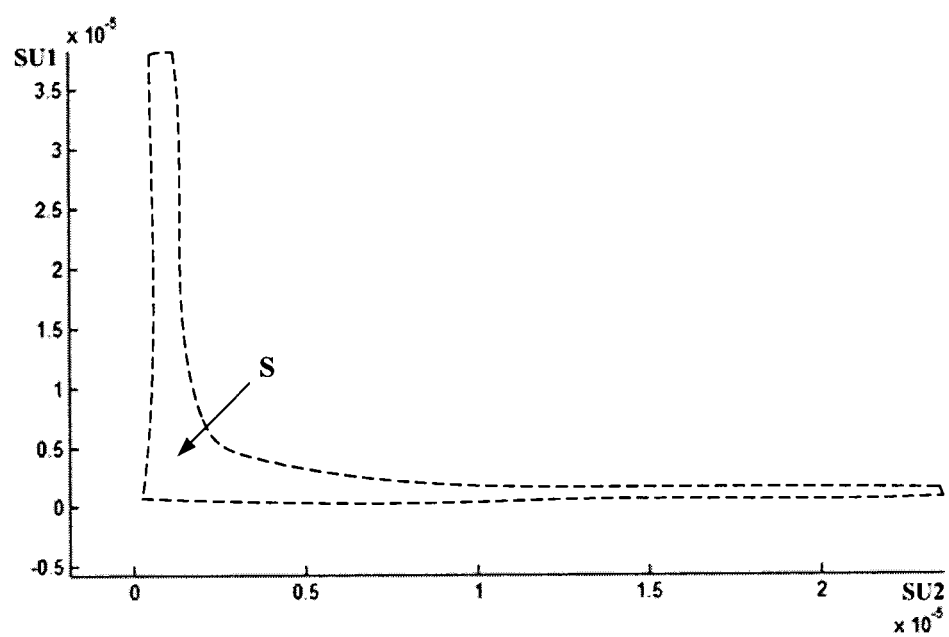
FIG. 5 is a schematic diagram illustrating a power space distribution envelope of a first type of node in a power space distribution model.

In an example in which the power space distribution model is the first class of model, "each of the types of nodes" processed by the first determining sub-unit 410 refers to the first type of node. FIG. 5 illustrates the power space distribution envelope of the first type of node in the power space distribution model in this case, where the envelope is as illustrated by the closed dotted line in FIG. 5. The area S enclosed by the closed dotted line represents the distribution area corresponding to the first type of node.

In an example in which the power space distribution model is the second class of model, "each of the types of nodes" processed by the first determining sub-unit 410 refers to each of the first type of node and the other types of nodes. In this case, for each of the types of nodes, an envelope (not illustrated) similar to the envelope of the closed dotted line S in FIG. 5 can be derived. An area enclosed by the envelope corresponding to each of the types of nodes represents the distribution area corresponding to the power strength level of the type of node.

In another implementation, if the communication system to be detected includes both the first type of node and the second type of node, then the first type of node has a first power strength level, and the second type of node has a second power strength level.

Taking the communication system to be detected being the primary system as an example, if the primary system includes two types of nodes, which are the primary user (which is an example of the first type of node) and the primary base station (which is an example of the second type of node). The first determining sub-unit 410 can determine the distribution areas corresponding to the respective first power strength level (i.e., the power strength level of the primary user), and second power strength level (i.e., the power strength level of the primary base station), of the power space distribution model of the transmission resource block to be detected, according to the first received signal power strengths of the transmission signal in the transmission resource block from the possible transmit positions of the primary user, and the second received signal power strengths of the transmission signal in the transmission resource block from the possible transmit positions of the primary base station.

Here the first received signal power strengths can be such ones of the received signal power strengths of the transmission signal in the transmission resource block from the respective possible transmit positions of the first type of node that are the closest to the received signal power strengths of the transmission signal in the transmission resource block to be detected.

For example, in case that "the received signal power strengths of the transmission signal in the transmission resource block to be detected" include the set of power strengths "$P_{su1}$, $P_{su2}$", if "the received signal power strengths of the transmission signal in the transmission resource block from the respective possible transmit positions of the first type of node" includes a plurality of sets of power strengths "$P_R(1,1)$, $P_R(2,1)$", "$P_R(1,2)$, $P_R(2,2)$", "$P_R(1,3)$, $P_R(2,3)$", etc., then the closest (e.g., the most similar) pair to "$P_{su1}$, $P_{su2}$" can be selected among "$P_R(1,1)$, $P_R(2,1)$", "$P_R(1,2)$, $P_R(2,2)$", "$P_R(1,3)$, $P_R(2,3)$", etc., where the sets of power strengths are essentially sequences of numbers, and the similarity between the sequences of numbers can be calculated as in the prior art, a repeated description thereof will be omitted here.

Similarly the second received signal power strengths can be such ones of the received signal power strengths of the transmission signal in the transmission resource block from the respective possible transmit positions of the second type of node that are the closest to the received signal power strengths of the transmission signal in the transmission resource block to be detected, and they can be selected in a process similar to the first received signal power strengths, a repeated description thereof will be omitted here.

Figure 6:
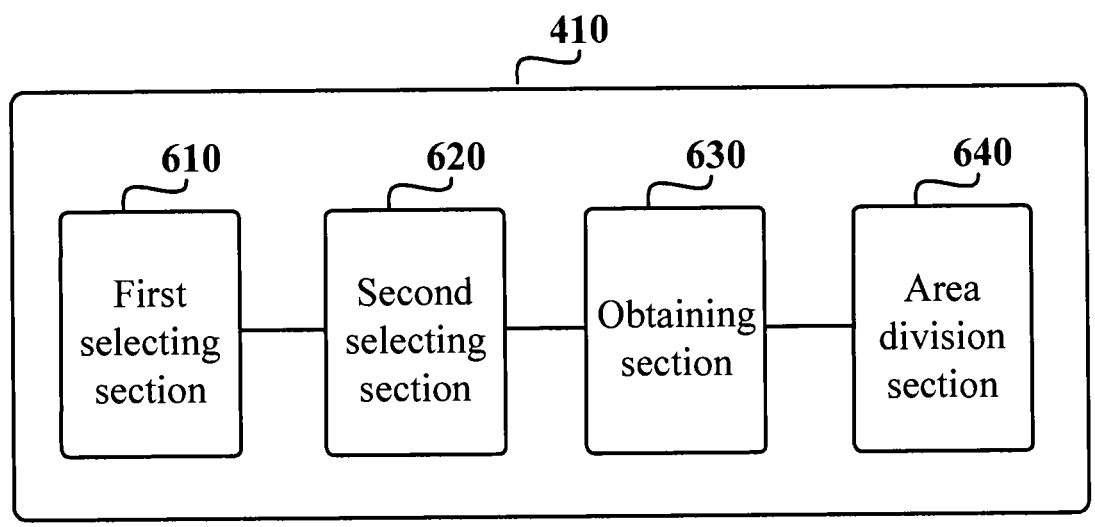
FIG. 6 is a block diagram schematically illustrating a possible exemplary structure of a first determining sub-unit as illustrated in FIG. 4.

FIG. 6 illustrates a possible exemplary structure of the first determining unit 410. As illustrated in FIG. 6, the first determining unit 410 can include a first selecting section 610, a second selecting section 620, an obtaining section 630, and an area division section 640.

In the example illustrated in FIG. 6, the primary system (which is an example of the communication system to be detected) is assumed to include the primary user (which is an example of the first type of node) with the first power strength level, and the primary base station (which is an example of the second type of node) with the second power strength level.

The first selecting section 610 can construct a power vector to be detected, from "the received signal power strengths of the transmission signal in the transmission resource block to be detected". For example, if "the received signal power strengths of the transmission signal in the transmission resource block to be detected" include the set of power strengths "$P_{su1}$, $P_{su2}$", then the first selecting section 610 can construct the power vector to be detected, in the form of $\overline{Et}=(P_{su1}, P_{su2})$.

Then among the respective received power vectors corresponding to the first power strength level, that is, among the respective received power vectors corresponding to the respective possible positions of the primary user, the first selecting section 610 can select such one of the received power vectors that is the closest to direction of the power vector to be detected, as a first test vector.

An exemplary process of selecting the first test vector will be described below in connection with FIG. 7A. For example, the respective received power vectors corresponding to the first power strength level can be represented as $\overline{E_{11}}$, $\overline{E_{12}}$, . . . , where FIG. 7A illustrates only a part of the respective received power vectors corresponding to the first power strength level for the sake of clarity.

Figure 7A:
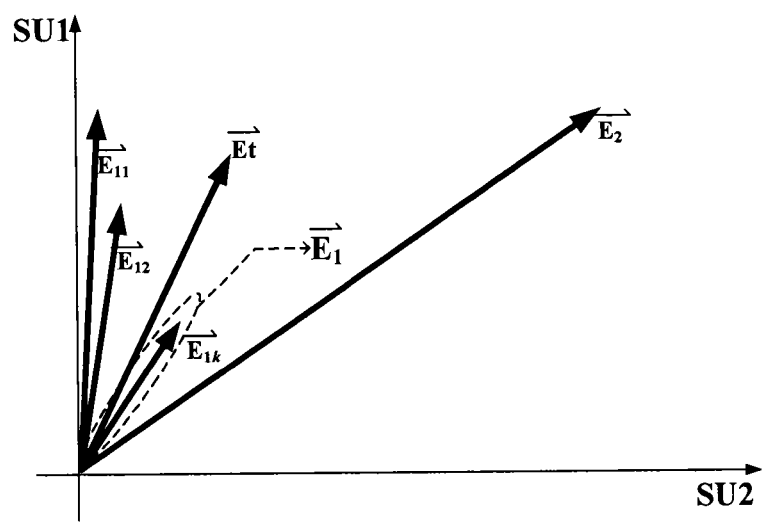
FIG. 7A to FIG. 7C are schematic diagrams illustrating examples of determination of a first test vector and a second test vector.

As illustrated in FIG. 7A, if such one of $\overline{E_{11}}$, $\overline{E_{12}}$, . . . , that is the closest to the direction of the power vector to be detected $\overline{Et}$ is the received power vector $\overline{E_{1k}}$, then the first selecting section 610 can select such a received power vector $\overline{E_{1k}}$ among $\overline{E_{11}}$, $\overline{E_{12}}$, . . . , that is the closest to the direction of the power vector to be detected Et as the first test vector.

In an implementation, the first selecting section 610 can calculate the closeness between the direction of each of $\overline{E_{11}}$, $\overline{E_{12}}$, . . . , and the direction of the power vector to be detected, in Equation 5 and Equation 6 below:

$$\langle x, y \rangle = \sum_{i}^{Ns} x_i y_i; \quad \text{Equation 5}$$

In Equation 5, x represents $$\frac{\overline{E_{1k}}}{\|\overline{E_{1k}}\|},$$

and y represents $$\frac{\overline{Et'}}{\|\overline{Et'}\|};$$

and $x_i$ represents the i-th element of x, and $y_i$ represents the i-th element of y, where $\overline{E_{1k}}$ and $\overline{Et}$ can be expressed particularly as described above for $\overline{E_{1k}}$ and $\overline{Et}$.

Thus the closeness between the direction of each of $\overline{E_{11}}$, $\overline{E_{12}}$, ..., and the direction of the power vector to be detected can be calculated, in Equation 6 below:

$$Sim(\overline{E_{1k}}, \overline{Et}) = \left\langle \frac{\overline{E_{1k}}}{\|\overline{E_{1k}}\|}, \frac{\overline{Et'}}{\|\overline{Et'}\|} \right\rangle; \quad \text{Equation 6}$$

Where $Sim(\overline{E_{1k}},\overline{Et})$ represents the closeness between the direction of $\overline{E_{1k}}$ (k=1, 2, ...) and the direction of $\overline{Et}$, and $\overline{Et'}$ represents a transposition of $\overline{Et}$.

$$\left\langle \frac{\overline{E_{1k}}}{\|\overline{E_{1k}}\|}, \frac{\overline{Et'}}{\|\overline{Et'}\|} \right\rangle$$

can be calculated in Equation 5 above.

Thus the closeness between the direction of each of $\overline{E_{11}}$, $\overline{E_{12}}$, ..., and the direction of the power vector to be detected can be derived. The highest one of the calculated respective closeness between the directions of $\overline{E_{11}}$, $\overline{E_{12}}$, ..., and the direction of the power vector to be detected can be selected, and $\overline{E_{1k}}$ corresponding to the highest closeness can be determined as the first test vector. For example, the received power vector which is the closest to the direction of the power vector to be detected can be determined in Equation 7 below:

$$k0 = \text{argmax}(\text{sim}(\overline{E_{1k}}, \overline{Et}));$$

Where k0 represents the value of k maximizing $\text{sim}(\overline{E_{1k}}, \overline{Et})$.

The second selecting section 620 is configured to determine a second test vector related to the received power vectors corresponding to the second power strength level.

Here if the second type of node includes only one primary base station, then the second selecting section 620 can determine the received power vector corresponding to the second power strength level as the second test vector. In this case, there is only one possible position of the primary base station in the communication system to be detected, i.e., the real position of the primary base station. The real position of the primary base station corresponds to one received power vector.

Moreover if the second type of nodes include a plurality of primary base stations, then the second selecting section 620 can determine the sum of all the received power vectors corresponding to the second power strength level as the second test vector.

In an example, in a scenario with multiple homogeneous cells, $\overline{E_{2int}}$ represents a received power vector corresponding to a primary base station in a target cell (i.e., a primary base station in the communication system to be detected), and $\overline{E_{2ext1}}$, $\overline{E_{2ext2}}$, ..., represent received power vectors corresponding to primary base stations in surrounding cells (i.e., primary base stations in other surrounding primary systems). In this case, each of the primary base stations corresponds respectively to one received power vector, so that the plurality of primary base stations correspond to a plurality of received power vectors. In this example, the second test vector $\overline{E_2}$ can be calculated in the equation of $\overline{E_2} = \overline{E_{2int}} + \overline{E_{2ext1}} + \overline{E_{2ext2}} + \ldots$.

In another example, in a scenario with multiple heterogeneous cells, target cells further include small base stations in a number of small cells in addition to macro base stations in macro cells. If $\overline{E_{2int1}}$, $\overline{E_{2int2}}$, ..., represent received power vectors corresponding respectively to the respective base stations (including the macro base stations and the small base stations) in the target cells, and similarly $\overline{E_{2ext1}}$, $\overline{E_{2ext2}}$, ..., represent received power vectors corresponding to primary base stations in surrounding cells, then the second test vector $\overline{E_2}$ can be calculated in the equation of $\overline{E_2} = \overline{E_{2int1}} + \overline{E_{2int2}} + \ldots + \overline{E_{2ext1}} + \overline{E_{2ext2}} + \ldots$.

Figure 7B:
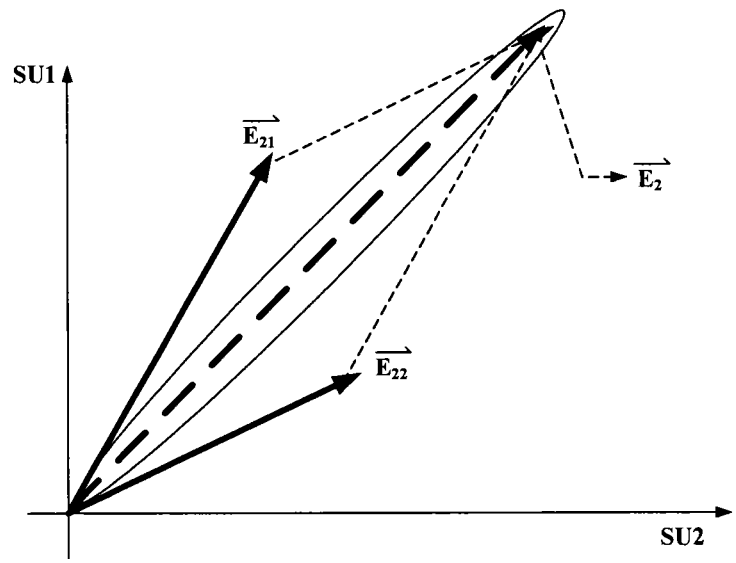

FIG. 7B illustrates an example of the primary system including two primary base stations (applicable to the scenario with multiple homogeneous cells, or the scenario with multiple heterogeneous cells, described above). As illustrated in FIG. 7B, $\overline{E_{21}}$ and $\overline{E_{22}}$ represent received power vectors corresponding respectively to the two primary base stations (for example, $\overline{E_{21}}$ can be $\overline{E_{2int}}$ above, and $\overline{E_{22}}$ can be $\overline{E_{2ext1}}$ above). The sum of the vectors $\overline{E_{21}}$ and $\overline{E_{22}}$ can be determined as the second test vector $\overline{E_2}$.

Figure 7C:
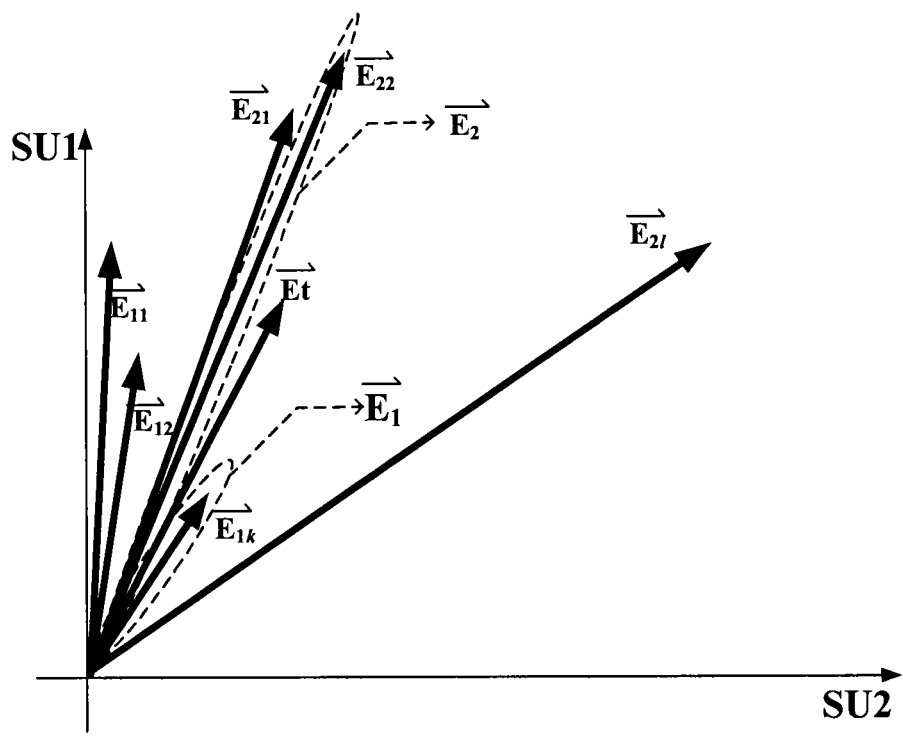

Moreover FIG. 7C further illustrates an example of another scenario. In the example illustrated in FIG. 7C, for example, the first type of node is a primary user, and the second type of node is a relay node. Thus there may be a plurality of possible positions of the primary user, and also a plurality of possible positions of the relay node, in the coverage area of the primary system. $\overline{E_{11}}$, $\overline{E_{12}}$, ..., can represent the respective received power vectors corresponding to the first power strength level, and $\overline{E_{21}}$, $\overline{E_{22}}$, ..., can represent the respective received power vectors corresponding to the second power strength level.

As illustrated in FIG. 7C, if such one of $\overline{E_{11}}$, $\overline{E_{12}}$, ..., that is the closest to the direction of the power vector to be detected $\overline{Et}$ is the received power vector $\overline{E_{1k}}$, and such one of $\overline{E_{21}}$, $\overline{E_{22}}$, ..., that is the closest to the direction of the power vector to be detected $\overline{Et}$ is the received power vector $\overline{E_{2j}}$, then the first selecting section 610 can determine $\overline{E_{1k}}$ as the first test vector $\overline{E_1}$, and the second selecting section 620 can determine $\overline{E_{2j}}$ as the first test vector $\overline{E_2}$.

Then the obtaining section 630 can obtain a boundary or an interface separating the first test vector from the second test vector.

For example, the obtaining section 630 can determine a reference point on a line connecting the endpoint of the first test vector $\overline{E_1}$, and the endpoint of the second test vector $\overline{E_2}$, and determine a straight line, a plane or a hyper plane, through the reference point, with a straight line, where the connecting line lies, being a normal line thereof, as the boundary or the interface.

Figure 7D:
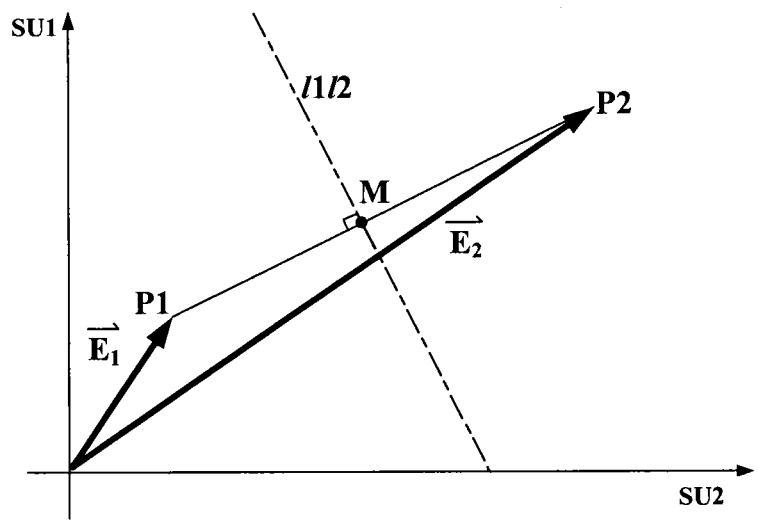
FIG. 7D to FIG. 7F are schematic diagrams illustrating examples of determination of a boundary between, and distribution areas of, the first test vector and the second test vector.

In an example, as illustrated in FIG. 7D, the obtaining section 630 can determine a midpoint M on a line P1P2 connecting the endpoint P1 of the first test vector $\overline{E_1}$, and the endpoint P2 of the second test vector $\overline{E_2}$ as the reference point, and determine a straight line l1/2, through the midpoint M, with a straight line, where the connecting line P1P2 lies, being a normal line thereof, as the boundary separating the first test vector $\overline{E_1}$ from the second test vector $\overline{E_2}$.

In another example, the obtaining section 630 can determine a shape with the endpoint P1 of the first test vector $\overline{E_1}$ being a center, and with the standard deviation of random additive noise being a radius as a first shape, and a shape with the endpoint P2 of the second test vector $\overline{E_2}$ being a center, and with the standard deviation of random additive noise being a radius as a second shape, where the first shape and the second shape can be circles, for example. An implementation of this example will be described below in connection with FIG. 7E and FIG. 7F.

Figure 7E:
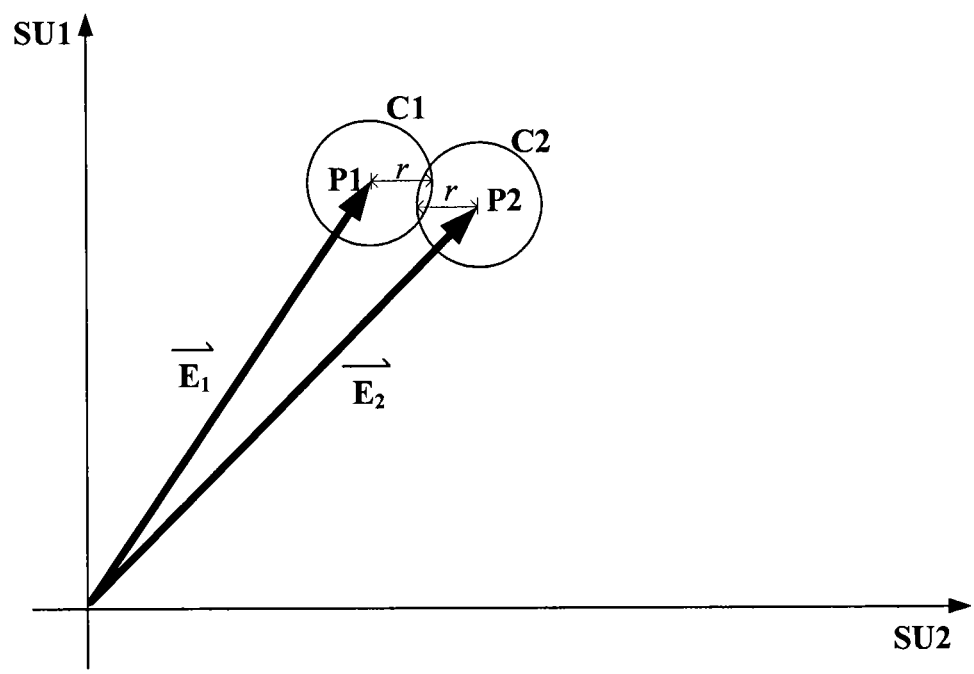
Figure 7F:
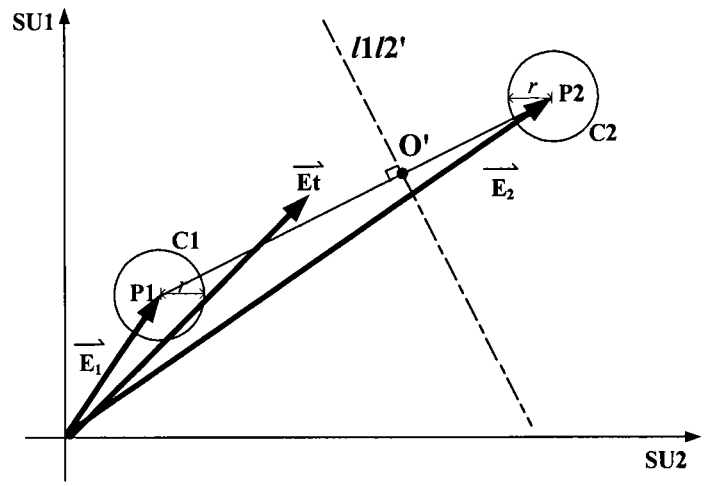

As illustrated in FIG. 7E and FIG. 7F, r represents the radius of the first circle (which is an example of the first shape) C1, and the second circle (which is an example of the second shape) C2, where the value of r is the standard deviation σ (a finite real number) of random additive noise.

If the first circle C1 intersects with the second circle C2, as illustrated in FIG. 7E, then the boundary between the first test vector $\overline{E_1}$ and the second test vector $\overline{E_2}$ can be determined as described above in connection with FIG. 7D, that is, the obtaining section 630 can determine a midpoint M on a line P1P2 connecting the endpoint P1 of the first test vector $\overline{E_1}$, and the endpoint P2 of the second test vector $\overline{E_2}$ as the reference point, and determine a straight line, through the midpoint M, with the straight line, where the connecting line P1P2 lies, being a normal line thereof, as the boundary separating the first test vector $\overline{E_1}$ from the second test vector $\overline{E_2}$. The boundary has been omitted in FIG. 7E for the sake of clarity.

Moreover if the first shape C1 does not intersect with the second shape C2, as illustrated in FIG. 7F, then the obtaining section 630 can determine a straight line, a plane or a hyper plane satisfying the following condition as the boundary (or the interface) separating the first test vector $\overline{E_1}$ from the second test vector $\overline{E_2}$: the direction of the normal line of the straight line, the plane or the hyper plane is the direction of a line connecting the center of the first circle C1 and the center of the second circle C2 (i.e., the straight line where the connecting line P1P2 lies), and the straight line, the plane or the hyper plane passes the centroid of a decision system including the center of the first circle C1 and a weight thereof, and the center of the second circle C2 and a weight thereof.

The decision system can be represented as $$\left\{ \left( \overline{E_1}, \sum_{i=1}^{N_s} SNR1_i \right), \left( \overline{E_2}, \sum_{i=1}^{N_s} SNR2_i \right) \right\},$$

for example.

Where $SNR_i$ represents a Signal to Noise Ratio (SNR), at the $SU_i$ (the i-th receive position), of $\overline{E_1}$ to indicate the weight of the center P1 of the first circle C1. $SNR1_i$ can be regarded as the mass of the point P1.

Similarly $SNR2_i$ represents a Signal to Noise Ratio (SNR), at the $SU_i$, of $\overline{E_2}$ to indicate the weight of the center P2 of the second circle C2. $SNR2_i$ can be regarded as the mass of the point P2.

Thus the centroid of the decision system can be determined as the point O' in FIG. 7F, so that a straight line l1/2', through the centroid O' of the decision system, with the straight line, where the connecting line P1P2 lies, being a normal line thereof, as the boundary separating the first test vector $\overline{E_1}$ from the second test vector $\overline{E_2}$.

It shall be noted that if the first test vector $\overline{E_1}$ and the second test vector $\overline{E_2}$ are vectors in three or more dimensions, then the first shape C1 and the second shape C2 will be shapes in three or more dimensions accordingly. For example, if the first test vector $\overline{E_1}$ and the second test vector $\overline{E_2}$ are vectors in three dimensions, then the first shape C1 and the second shape C2 can be spheres accordingly, and the boundary separating the first test vector $\overline{E_1}$ from the second test vector $\overline{E_2}$ may be a plane or a hyper plane, e.g., a hyper plane in a $N_{SU}$-dimension space.

Thus the area division section 640 can determine an area on one side, of the boundary or the interface, corresponding to the first test vector as a first area, and an area on the other side, of the boundary or the interface, corresponding to the second test vector as a second area. As illustrated in FIG. 7F, for example, the first area determined by the area division section 640 is the area on the left side of the straight line l1/2', and the second area determined by the area division section 640 is the area on the right side of the straight line l1/2'.

Referring to FIG. 4, after the first determining sub-unit 410 determines the distribution area corresponding to each of the power strength levels of the power space distribution model, the second determining sub-unit 520 can determine the distribution area, in which the power strengths of the signal transmitted in the transmission resource block to be detected lie, in the power space distribution model, and determines the power strength level corresponding to the distribution area, in which the power strengths lie, as the power level of the signal transmitted in the transmission resource block to be detected.

"the power strengths of the signal transmitted in the transmission resource block to be detected" can be represented as the power vector to be detected, for example, thus the distribution area in which "the power strengths of the signal transmitted in the transmission resource block to be detected" lie can be represented as the distribution area in which the power vector to be detected lies.

As illustrated in FIG. 7F, for example, the power vector to be detected $\overline{Et}$ lies in the area on the left side of the straight line l1/2', so the distribution area, in which the power vector to be detected $\overline{Et}$ lies, is the first area. Thus in the example illustrated in FIG. 7F, the second determining sub-unit 420 can determine the power strength level corresponding to the first area as the power level of the signal transmitted in the transmission resource block to be detected, that is, determine the first power strength level of the first type of node (e.g., the primary user) as the power level of the signal transmitted in the transmission resource block to be detected.

Referring to FIG. 3, after the power level determining unit 340 determines the power level of the signal transmitted in the transmission resource block to be detected, the node type judging unit 350 can judge the type of node transmitting the signal according to the power level determined by the power level determining unit 340. As illustrated in FIG. 7F, for example, the node type judging unit 350 determines the type of the first type of node (e.g., the primary user) as the type of node transmitting the signal.

Moreover, as described above, in some implementations, the power space distribution model used by the power level determining unit 340 may be the first class of model. In this case, the power space distribution model includes only the power space distribution of the first type of node.

In an example, there are two types of nodes assumed in the communication system to be detected, e.g., a first type of node with a power strength level $L_A$, and a second type of node with a power strength level $L_B$. Moreover the constructed power space distribution model is assumed to include only a power space distribution of the power strength level $L_A$ (corresponding to the first type of node). Thus if the power vector to be detected lies in the area corresponding to the first type of node, then the node type judging unit 350 judges that the type of a transmitting node corresponding to the signal transmitted in the transmission resource block to be detected is the same as the type of the first type of node; otherwise, it judges that the type of the transmitting node corresponding to the signal transmitted in the transmission resource block to be detected is the same as the type of the second type of node.

In a real application, the type of node corresponding to the signal transmitted in the transmission resource block to be detected can be determined for a number of purposes to thereby facilitate subsequent operations and processes relating to and/or matching with the type of node thereof by the user. For example, one of the purposes can be judgment of an uplink or downlink state of the transmission resource block to be detected.

Figure 8:
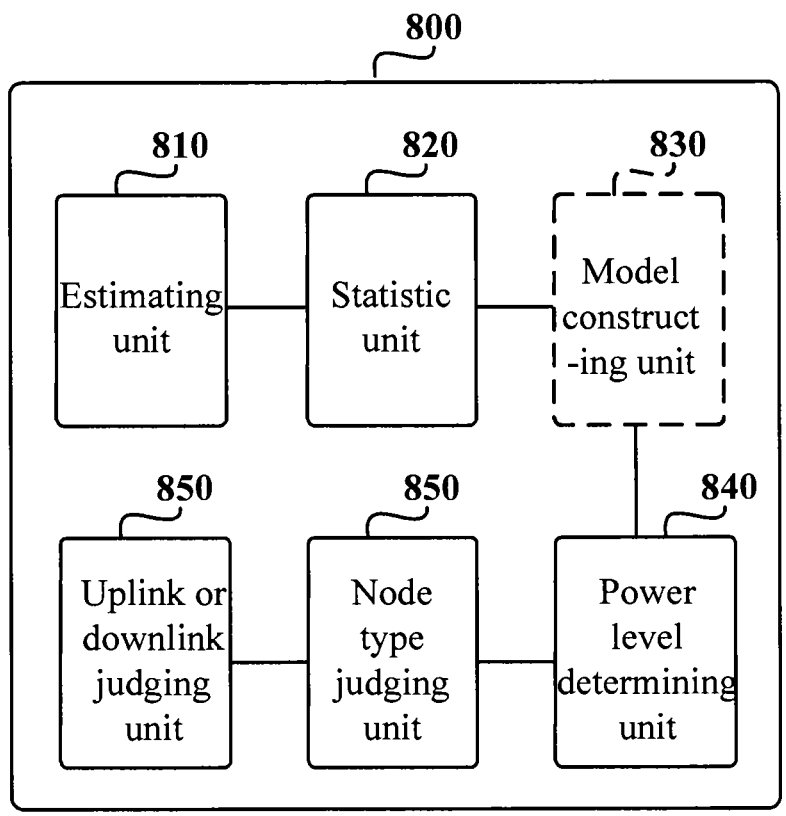
FIG. 8 is a block diagram schematically illustrating another exemplary structure of the device in a radio communication system according to the embodiment of the invention.

FIG. 8 schematically illustrates another example of the device in a radio communication system according to the embodiment of the invention (hereinafter a fifth example). In the fifth example, the device 800 in a radio communication system can further include an uplink or downlink judging unit 860 in addition to an estimating unit 810, a statistic unit 820, a power level determining unit 840, and a node type judging unit 850.

Here for example, the estimating unit 810 and the statistic unit 820 in the device 800 can have the same structures and functions as the corresponding units in the device 100 described above in connection with FIG. 1A while attaining similar technical effects, thus a repeated description thereof will be omitted here.

Moreover in the device 800, for example, the power level determining unit 840 can have the same structures and functions as the power level determining unit 340 described above in connection with FIG. 3 or FIG. 4, and the node type judging unit 850 can have the same structures and functions as the node type judging unit 350 described above in connection with FIG. 3, respectively while attaining similar technical effects, thus a repeated description thereof will be omitted here.

If the communication system to be detected is the primary system including two types of nodes, i.e., a primary user (which is an example of the first type of node), and a primary base station (which is an example of the second type of node). If the power vector to be detected lies in the first area, then the uplink or downlink judging unit 860 can judge that the signal transmitted in the transmission resource block to be detected is transmitted by the primary user, and the transmission resource block to be detected is in the uplink state.

If the power vector to be detected lies in the second area, then the uplink or downlink judging unit 860 can judge that the signal transmitted in the transmission resource block to be detected is transmitted by the primary base station, and the transmission resource block to be detected is in the downlink state.

As illustrated in FIG. 7, for example, since the power vector to be detected $\overline{Et}$ lies in the first area, the uplink or downlink judging unit 860 judges that the signal transmitted in the transmission resource block to be detected is transmitted by the primary user, and the transmission resource block to be detected is in the uplink state.

The description above relates to the scenario with one transmission resource block to be detected.

As can be apparent from the description above, the device above in a radio communication system according to the embodiment of the invention can judge the uplink or downlink state of the transmission resource block to be detected, simply using a small number of (e.g., one) transmission resource blocks to be detected. Thus the complexity in processing by the device can be lowered, and the operations thereof can be simplified and easy to perform, thus achieving high utility thereof.

If the same sub-frame includes a plurality of transmission resource blocks to be detected, then the uplink or downlink judging unit 860 can judge the uplink or downlink state of each of the plurality of transmission resource blocks to be detected, by processing respectively for each of the plurality of transmission resource blocks to be detected, as described for one transmission resource block to be detected.

If the uplink or downlink judging unit 860 judges that all of the plurality of transmission resource blocks to be detected are in the downlink state, then it can further judge that the sub-frame is in the downlink state.

If the uplink or downlink judging unit 860 judges that at least one of the plurality of transmission resource blocks to be detected are in the uplink state, then it can further judge that the sub-frame is in the uplink state.

With a larger number of transmission resource blocks to be detected, there will have higher robustness against interference in the algorithm, and the result of the algorithm will also become more accurate. In a real application, the particular number of transmission resource blocks to be detected can be determined as required in reality.

Moreover in the fifth example, if the number of possible transmit positions of the first type of node (and preferably the other types of nodes) is desirably as low as possible, the number of possible transmit positions can be set to satisfy such a condition that the ratio of incorrect detection of the downlink state is less than or equal to 90%, and the ratio of incorrect detection of the uplink state is less than or equal to 1%.

It shall be noted that in some implementation, the device 800 can further selectively include a model constructing unit 830 in addition to the estimating unit 810, the statistic unit 820, the power level determining unit 840, the node type judging unit 850, and the uplink or downlink judging unit 860. For example, the model constructing unit 830 can have the same structures and functions as the model constructing unit in the device 200 described above in connection with FIG. 2 while attaining similar technical effects, thus a repeated description thereof will be omitted here.

Moreover an embodiment of the invention further provides another device in a radio communication system, and an example of the device (hereinafter a sixth example) will be described below in details in connection with FIG. 9. It shall be noted that the same processes and operations as the corresponding components in the descriptions above in connection with FIG. 1A to FIG. 8 can be applicable to the examples described below in connection with FIG. 9 to FIG. 12 while attaining similar technical effects, thus a repeated description thereof will be omitted here.

Figure 9:
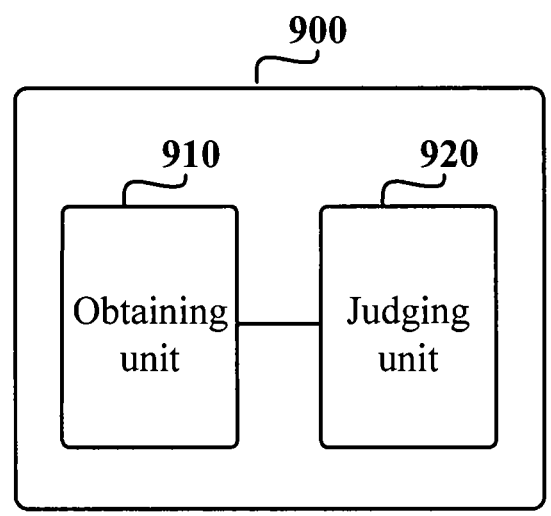
FIG. 9 is a block diagram schematically illustrating an exemplary structure of another device in a radio communication system according to an embodiment of the invention.

As illustrated in FIG. 9, the device 900 in a radio communication system includes an obtaining unit 910 and a judging unit 920.

Here the obtaining unit 910 is configured to obtain power strengths of a signal, of the communication system to be detected, in a transmission resource block to be detected, received on at least two receive positions. The judging unit 920 is configured to judge a type of node corresponding to a node transmitting the signal in the transmission resource block to be detected, in the communication system to be detected, using a power space distribution model according to the power strengths of the signal, of the communication system to be detected, in the transmission resource block to be detected, where the power space distribution model reflects at least a statistic result of estimated received signal power strengths, at two of the receive positions, of a transmission signal in a transmission resource block from each of one or more possible transmit positions of the first type of node in the communication system to be detected.

In an implementation, the power space distribution model can be the first class of model described above.

In another implementation, the power space distribution model can be the second class of model described above. In this case, the power space distribution model can reflect a statistic result of estimated received signal power strengths, at each of the receive positions, of a transmission signal in a transmission resource block from each of one or more possible transmit positions of the first type of node and the other types of nodes in the communication system to be detected, where signal transmit power strength levels of the respective types of nodes are different from each other.

Moreover in a preferred implementation, the judging unit 920 can be further configured to further judge an uplink or downlink state of the transmission resource block to be detected, during judging the type of node corresponding to the node transmitting the signal in the transmission resource block to be detected, in the communication system to be detected, where in this preferred implementation, reference can be made to the function and the process of the uplink or downlink judging unit 860 described above in connection with FIG. 8 for a process of the judging unit 920 to judge the uplink or downlink state of the transmission resource block to be detected while attaining similar technical effects. A repeated description thereof will be omitted here.

It shall be noted that in an implementation of the device 900 in a radio communication system according to the embodiment of the invention, the obtaining unit 910 and the judging unit 920 can be located separately in space.

In an example, the obtaining unit 910 can include at least two secondary users located in the coverage area of the primary system (which is an example of the communication system to be detected), where the at least two secondary users are located in different positions in the coverage area of the primary system (which is an example of the communication system to be detected). Moreover the judging unit 920 can be located in another device, e.g., a secondary system spectrum manager.

In this example, the secondary system spectrum manager can be located selectively inside or outside the coverage area of the primary system as long as it can enable the judging unit 920 to communicate with the obtaining unit 910 (i.e., the respective secondary users).

Thus the secondary users can receive the signal of the primary system in the transmission resource block to be detected, and measure power strengths of the signal, and then report the obtained power strengths of the signal to the judging unit 920 in the secondary system spectrum manager. Then the judging unit 920 can judge a type of node corresponding to a node transmitting the signal in the transmission resource block to be detected, in the primary system using a corresponding power space distribution model. Preferably the secondary system spectrum manager can be further configured to judge an uplink or downlink state of the transmission resource block to be detected, using the power space distribution model, and selectively perform other subsequent processes, for example, instruct a corresponding secondary user to access a spectrum resource, according to a result of the judgment (i.e., the uplink state or the downlink state).

In another implementation of the device 900 in a radio communication system according to the embodiment of the invention, both the obtaining unit 910 and the judging unit 920 are located in the secondary system spectrum resource manager, and the obtaining unit 910 is only an interface via which the power strengths of the signal reported by the secondary users are received, instead of receiving and measuring the signal of the primary system directly.

Figure 10:
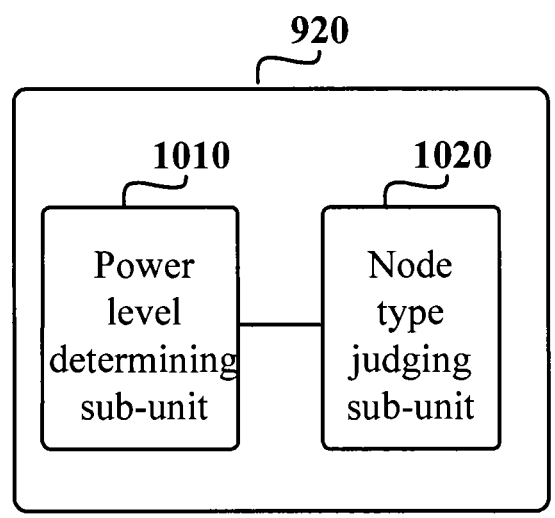
FIG. 10 is a block diagram schematically illustrating a possible exemplary structure of a judging unit as illustrated in FIG. 9.

FIG. 10 illustrates a possible exemplary structure of the judging unit 920. As illustrated in FIG. 10, the judging unit 920 can include a power level determining sub-unit 1010 and a type of node judging sub-unit 1020.

Here the power level determining sub-unit 1010 can determine a power level of a signal transmitted in a transmission resource block to be detected, using the power space distribution model according to power strengths, received at one or more of the plurality of receive positions, of the signal transmitted in the transmission resource block to be detected.

Then the type of node judging sub-unit 1020 can judge a type of node corresponding to a node transmitting the signal, according to the determined power level of the signal transmitted in the transmission resource block to be detected.

Here for example, the power level determining sub-unit 1010 and the type of node judging sub-unit 1020 can have the same structures and functions respectively as the power level determining sub-unit 340 and the type of node judging sub-unit 350 described above in connection with FIG. 3 while attaining similar technical effects. A repeated description thereof will be omitted here.

Figure 11:
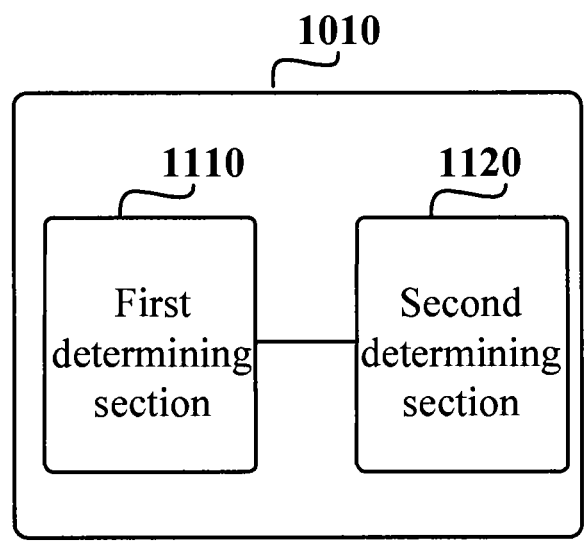
FIG. 11 is a block diagram schematically illustrating a possible exemplary structure of a power level determining sub-unit as illustrated in FIG. 10.

Moreover FIG. 11 illustrates a possible exemplary structure of the power level determining sub-unit 1010. As illustrated in FIG. 11, the power level determining sub-unit 1010 can include a first determining section 1110 and a second determining section 1120.

The first determining section 1110 can determine a distribution area corresponding to each of the power strength levels in the power space distribution model.

The second determining section 1120 can determine a distribution area in which the power strength of the signal transmitted in the transmission resource block to be detected lies in the power space distribution model, and determine the power strength level corresponding to the distribution area, in which the power strength lies, as the power level of the signal transmitted in the transmission resource block to be detected.

Here for example, the first determining section 1110 and the second determining section 1120 can have the same structures and functions respectively as the first determining sub-unit 410 and the second determining sub-unit 420 described above in connection with FIG. 4 while attaining similar technical effects. A repeated description thereof will be omitted here.

Figure 12:
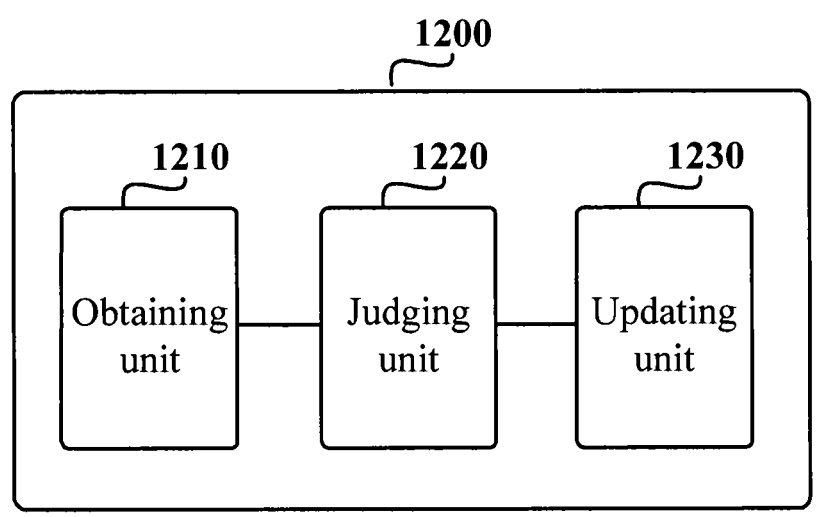
FIG. 12 is a block diagram schematically illustrating another exemplary structure of the other device in a radio communication system according to the embodiment of the invention.

FIG. 12 schematically illustrates another example of the device in a radio communication system according to the embodiment of the invention (hereinafter a seventh example). In the seventh example, the device 1200 in a radio communication system can further include an updating unit 1230 in addition to the obtaining unit 1210 and the judging unit 1220, where the obtaining unit 1210 and the judging unit 1220 in the device 1200 can have the same structures and functions respectively as the obtaining unit 910 and the judging unit 920 described above in connection with FIG. 9 while attaining similar technical effects. A repeated description thereof will be omitted here.

Here the updating unit 1230 is configured to control the power space distribution model periodically to be updated. For example, if the device 1200 includes the model constructing unit described above, then the updating unit 1230 can control the model constructing unit periodically to reconstruct the power space distribution model so that the constructed power space distribution model can better reflect the current communication environment, so the result of processing using the updated power space distribution model will become more accurate.

Thus the device in a radio communication system described above in connection with FIG. 9 to FIG. 12 can judge the uplink or downlink state of the transmission resource block to be detected, simply using a small number of (e.g., one) transmission resource blocks to be detected. Thus the complexity in processing by the device can be lowered, and the operations thereof can be simplified and easy to perform, thus achieving high utility thereof. A repeated description of the other technical effects similar to those described above in connection with FIG. 1A to FIG. 8 will be omitted here.

Moreover an embodiment of the invention further provides a method in a radio communication system, and an exemplary process of the method will be described below in connection with FIG. 13.

Figure 13:
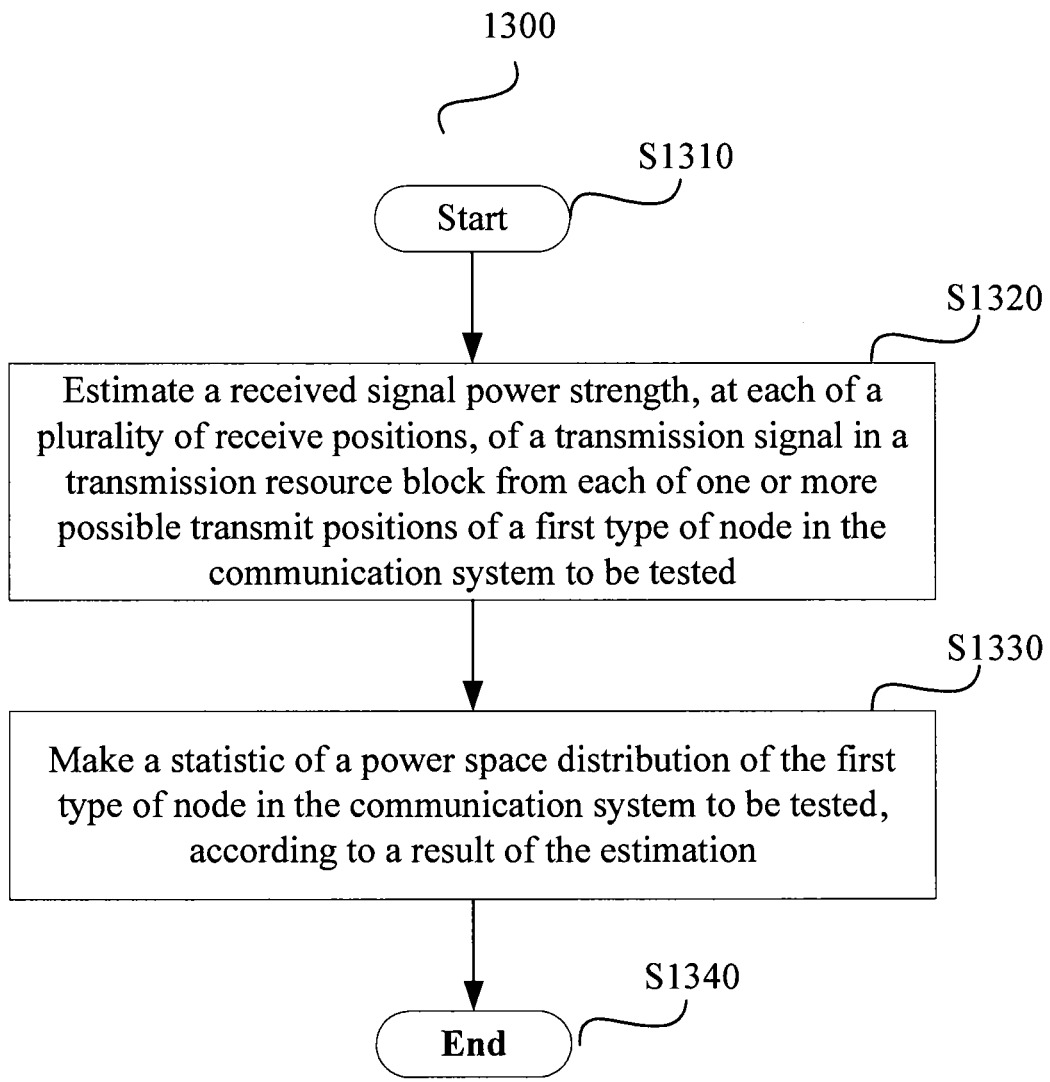
FIG. 13 is a flow chart schematically illustrating an exemplary process of a method in a radio communication system according to an embodiment of the invention.

As illustrated in FIG. 13, a process flow 1300 of the method in a radio communication system according to the embodiment of the invention starts with the step S1310, and then proceeds to the step S1320.

In the step S1320, the process estimates a received signal power strength, at each of a plurality of receive positions, of a transmission signal in a transmission resource block from each of one or more possible transmit positions of a first type of node in the communication system to be detected. Then the process proceeds to the step S1330. Where for example, processing in the step S1320 can be the same as processing by the estimating unit described above in connection with any one of FIG. 1A to FIG. 8 while attaining similar technical effects. A repeated description thereof will be omitted here.

In the step S1330, the process makes a statistic of a power space distribution of the first type of node in the communication system to be detected, according to a result of the estimation. Then the process proceeds to the step S1340. Where for example, processing in the step S1330 can be the same as processing by the statistic unit described above in connection with any one of FIG. 1A to FIG. 8 while attaining similar technical effects. A repeated description thereof will be omitted here.

The process flow 1300 ends at the step S1340.

As can be apparent from the description above, the method above in a radio communication system according to the embodiment of the invention can derive the power space distribution of the first type of node in the communication system to be detected, simply using a small number of (e.g., one) transmission resource block to be detected. Thus the complexity in processing by the method can be lowered, and the operations thereof can be simplified and easy to perform, thus achieving high utility thereof. A repeated description of the other technical effects similar to those described above in connection with FIG. 1A to FIG. 8 will be omitted here.

Moreover an embodiment of the invention further provides another method in a radio communication system, and an exemplary process of the method will be described below in connection with FIG. 14.

Figure 14:
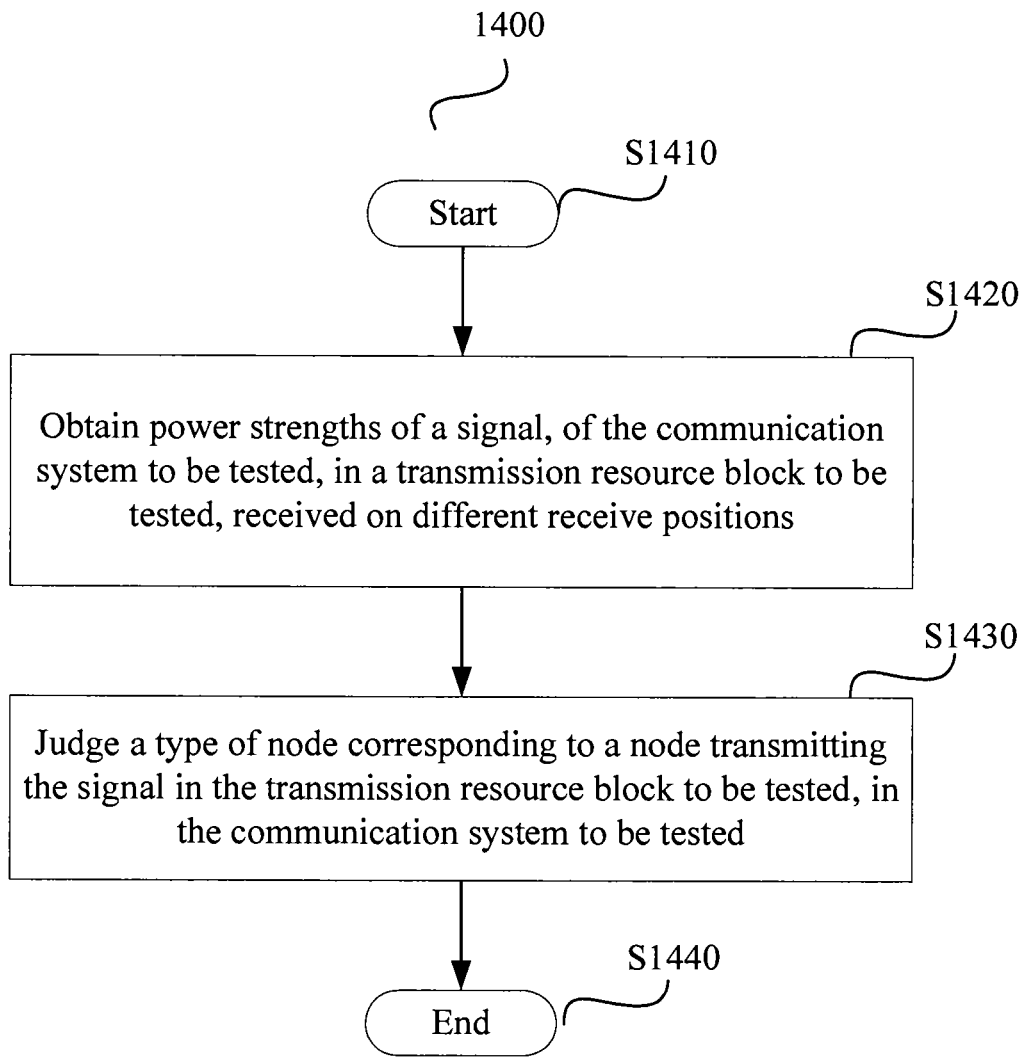
FIG. 14 is a flow chart schematically illustrating an exemplary process of a method in another radio communication system according to an embodiment of the invention.

As illustrated in FIG. 14, a process flow 1400 of the method in a radio communication system according to the embodiment of the invention starts with the step S1410, and then proceeds to the step S1420.

In the step S1420, the process obtains power strengths of a signal, of the communication system to be detected, in a transmission resource block to be detected, received on at least two receive positions. Then the process proceeds to the step S1420. Where for example, processing in the step S1420 can be the same as processing by the obtaining unit described above in connection with any one of FIG. 9 to FIG. 12 while attaining similar technical effects. A repeated description thereof will be omitted here.

In the step S1430, the process judges a type of node corresponding to a node transmitting the signal in the transmission resource block to be detected, in the communication system to be detected, using a power space distribution model according to the power strengths of the signal, of the communication system to be detected, in the transmission resource block to be detected. Then the process proceeds to the step S1440.

Here the power space distribution model can constructed at least by making a statistic of estimated received signal power strengths, at two of the receive positions, of a transmission signal in a transmission resource block from each of one or more possible transmit positions of the first type of node in the communication system to be detected.

Moreover processing in the step S1430 can be the same as processing by the judging unit described above in connection with any one of FIG. 9 to FIG. 12 while attaining similar technical effects. A repeated description thereof will be omitted here.

The process flow 1400 ends at the step S1440.

Thus the method in a radio communication system described above in connection with FIG. 14 can judge the uplink or downlink state of the transmission resource block to be detected, simply using a small number of (e.g., one) transmission resource block to be detected. Thus the complexity in processing by the method can be lowered, and the operations thereof can be simplified and easy to perform, thus achieving high utility thereof. A repeated description of the other technical effects similar to those described above in connection with FIG. 1A to FIG. 9 to FIG. 12 will be omitted here.

For example, the devices and methods above in a radio communication system according to the respective embodiments of the invention can be applicable to a TD-LTE communication system.

The respective units, sub-units, modules, etc., in the devices above in a radio communication system according to the embodiments of the invention can be configured in software, firmware, hardware or any combination thereof. In the case of being embodied in software or firmware, program constituting the software or firmware can be installed from a storage medium or a network to a machine with a dedicated hardware structure (e.g., a general-purpose machine 1500 illustrated in FIG. 15) which can perform various functions of the units, sub-units, modules, etc., above when various pieces of programs are installed thereon.

Figure 15:
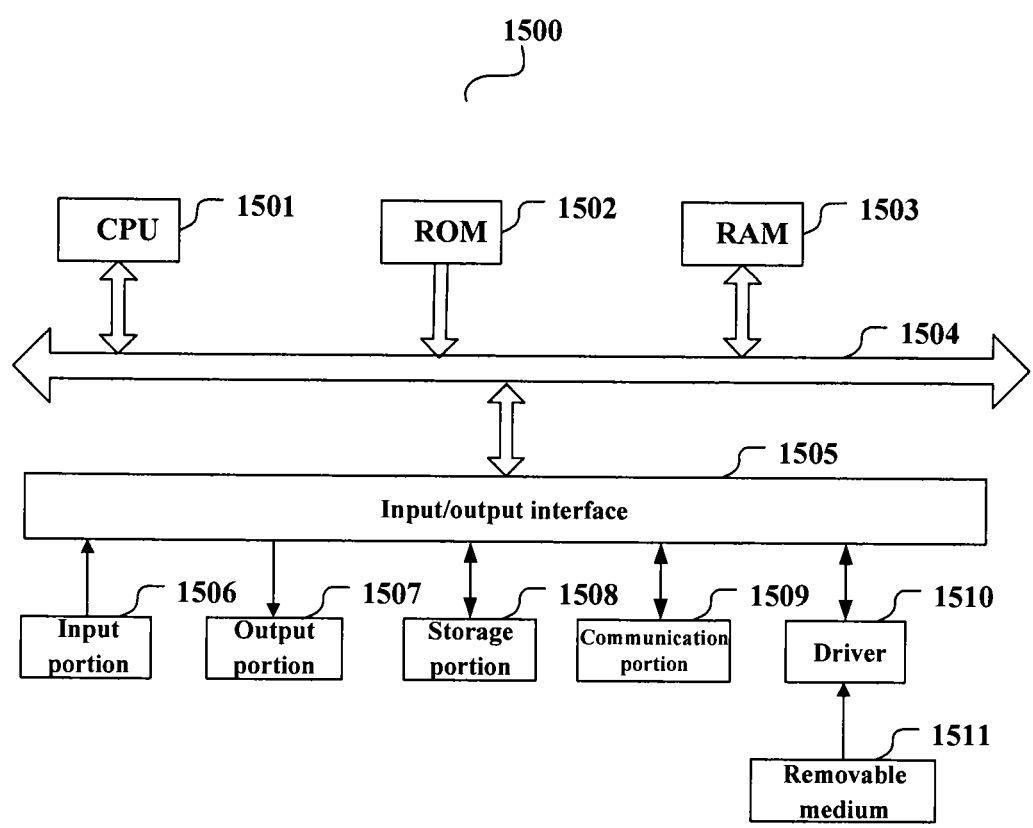
FIG. 15 is a simplified structural diagram illustrating a possible hardware configuration of an information processing device in which the device and method in a radio communication system according to the embodiments of the invention can be embodied.

FIG. 15 is a simplified structural diagram illustrating a possible hardware configuration of an information processing device in which the device and method in a radio communication system according to the embodiments of the invention can be embodied.

In FIG. 15, a Central Processing Unit (CPU) 1501 performs various processes according to program stored in a Read Only Memory (ROM) 1502 or loaded from a storage portion 1508 into a Random Access Memory (RAM) 1503 in which data required when the CPU 1501 performs the various processes, etc., is also stored as needed. The CPU 1501, the ROM 1502, and the RAM 1503 are connected to each other via a bus 1504 to which an input/output interface 1505 is also connected.

The following components are connected to the input/output interface 1505: an input portion 1506 (including a keyboard, a mouse, etc.), an output portion 1507 (including a display, e.g., a Cathode Ray Tube (CRT), a Liquid Crystal Display (LCD), etc., and a speaker, etc.), a storage port 1508 (including a hard disk, etc.), and a communication portion 1509 (including a network interface card, e.g., an LAN card, an MODEM, etc). The communication portion 1509 performs a communication process over a network, e.g., the Internet. A driver 1510 is also connected to the input/output interface 1505 as needed. A removable medium 1511, e.g., a magnetic disk, an optical disk, an optic-magnetic disk, a semiconductor memory, etc., can be installed on the driver 1510 as needed so that computer program fetched therefrom can be installed into the storage portion 1508 as needed.

In the case that the foregoing series of processes are performed in software, program constituting the software can be installed from a network, e.g., the Internet, etc., or a storage medium, e.g., the removable medium 1511, etc.

Those skilled in the art shall appreciate that such a storage medium will not be limited to the removable medium 1511 illustrated in FIG. 15 in which the program is stored and which is distributed separately from the apparatus to provide a user with the program. Examples of the removable medium 1511 include a magnetic disk (including a Floppy Disk), an optical disk (including Compact Disk-Read Only memory (CD-ROM) and a Digital Versatile Disk (DVD)), an optic-magnetic disk (including a Mini Disk (MD) (a registered trademark)) and a semiconductor memory. Alternatively the storage medium can be the ROM 1502, a hard disk included in the storage port 1508, etc., in which the program is stored and which is distributed together with the apparatus including the same to the user.

Furthermore the invention further proposes a product program on which machine readable instruction codes are stored. The instruction codes can perform the method in a radio communication system according to the embodiment of the invention upon being read and executed by a machine. Correspondingly various storage mediums carrying the program product, e.g., a magnetic disk, an optical disk, an optic-magnetic disk, a semiconductor memory, etc., will also be encompassed in the disclosure of the invention.

In the foregoing description of the particular embodiments of the invention, a feature described and/or illustrated with respect to an implementation can be used identically or similarly in one or more other implementations in combination with or in place of a feature in the other implementation(s).

Furthermore the methods according to the respective embodiments of the invention will not necessarily be performed in a sequential order described in the specification or illustrated in the drawings but can alternatively be performed in another sequential order concurrently or separately. Therefore the technical scope of the invention will not be limited by the order in which the methods are performed as described in the specification.

Furthermore apparently the respective operation processes of the methods according to the invention described above can also be embodied in computer executable program stored in various machine readable storage mediums.

Moreover the object of the invention can also be attained as follows: the storage medium in which the executable program codes are stored is provided directly or indirectly to a system or a device and a computer or a Central Processing Unit (CPU) in the system or the device can read and execute the program codes.

At this time an implementation of the invention will not be limited to the program so long as the system or the device has the function of executing the program, and the program can also be in any form, e.g., object program, program executed by an interpreter, script program provided to an operating system, etc.

These mechanize readable storage mediums listed above can include but will not be limited to various memories and storage units, semiconductor devices, magnetic units, e.g., optical, magnetic and optic-magnetic disks, and other mediums suitable for storing information, etc.

Furthermore the invention can also be embodied by a customer computer being connected to a corresponding website over the Internet and downloading and installing thereon the computer program codes according to the invention and then executing the program.

Finally it shall be noted that such relationship terms in this context as left and right, first and second, etc., are merely intended to distinguish one entity or operation from another entity or operation but not necessarily intended to require or suggest any such a real relationship or order between these entities or operations. Furthermore the terms "include", "comprise" and any variants thereof are intended to encompass nonexclusive inclusion so that a process, a method, an article or an apparatus including a series of elements includes not only those elements and also one or more other elements which are not listed explicitly or one or more elements inherent to the process, the method, the article or the apparatus. Unless stated otherwise, an element being defined in the sentence "include/comprise a(n) . . . " will not exclude the presence of one or more additional identical element in the process, the method, the article or the apparatus including the element.

The invention claimed is:

1. A device in a radio communication system, comprising: circuitry configured to
   estimate power strengths of a signal received, at a plurality of receive positions on a transmission resource to be detected, from one or more possible transmit positions of a first type of node; and
   make a statistic of a power space distribution of the first type of node, according to a result of estimation.

2. The device in a radio communication system according to claim 1, where the circuitry is further configured to:
   construct a power space distribution model to represent a result of the statistic of the power space distribution, based upon the power strengths, at the respective receive positions, from the respective possible transmit positions of the first type of node, wherein the power space distribution model reflects a result of a statistic of a signal power strength distribution in a multi-dimension power space corresponding to received power at the plurality of receive positions.

3. The device in a radio communication system according to claim 2, wherein the circuitry is further configured to:
- estimate the power strengths, at each of the plurality of receive positions, of the transmission signal on the transmission resource from each of one or more possible transmit positions of other respective types of nodes; and
- make a statistic of power space distributions of the other types of node, where signal transmit power strength levels of the respective types of nodes are different from each other.

4. The device in a radio communication system according to claim 3, wherein the circuitry is further configured to:
- determine a power level of a signal transmitted on a transmission resource to be detected, from a power strength or strengths of the signal, received at one or more of the plurality of receive positions, using the power space distribution model; and
- judge a type of node transmitting the signal, according to the determined power level of the signal transmitted on the transmission resource to be detected.

5. The device in a radio communication system according to claim 4, wherein the circuitry is further configured to:
- determine a distribution area corresponding to each of the power strength levels in the power space distribution model; and
- determine a distribution area in which the power strength of the signal transmitted on the transmission resource to be detected lies in the power space distribution model, and determine the power strength level corresponding to the distribution area, in which the power strength lies, as the power level of the signal transmitted on the transmission resource to be detected.

6. The device in a radio communication system according to claim 5, wherein:
- the circuitry is further configured to
- estimate power strengths of a signal received, at a plurality of receive positions on a transmission resource to be detected, from one or more possible transmit positions of a second type of node; and
- make a statistic of a power space distribution of the second type of node, according to a result of estimation, wherein the first type of node is with a first power strength level and the second type of node is with a second power strength level; and
- the circuitry is configured to determine distribution areas, corresponding to the first power strength level, and the second power strength level, of the power space distribution model of the transmission resource to be detected, according to first power strengths of a transmission signal from the respective possible transmit positions of the first type of node, and second power strengths of a transmission signal from respective possible transmit positions of the second type of node,
- wherein the first power strengths are ones of the power strengths of the transmission signal from the respective possible transmit positions of the first type of node that are the closest to the power strengths of the transmission signal on the transmission resource to be detected, and
- the second power strengths are ones of the power strengths of the transmission signal from the respective possible transmit positions of the second type of node that are the closest to the power strengths of the transmission signal on the transmission resource to be detected.

7. The device in a radio communication system according to claim 1, wherein the communication system to be detected is a primary system, and the first type of node is a primary user, wherein the plurality of receive positions are located respectively at positions where any one of a secondary user, an access point, and a spectrum manager in a coverage area of the primary system is located.

8. A device in a radio communication system, comprising: circuitry configured to
- obtain power strengths of a signal received by at least two receive positions on a transmission resource to be detected; and
- judge a type of node corresponding to a node transmitting the signal, using a power space distribution model according to the power strengths of the signal, wherein the power space distribution model reflects a statistic result of estimated power strengths of signal received by at least two of receive positions from one or more possible transmit positions of a first type of node.

9. The device in a radio communication system according to claim 8, wherein the power space distribution model further reflects a statistic result of estimated power strengths of signal received by the at least two of receive positions from the one or more possible transmit positions of other types of nodes, wherein signal transmit power strength levels of the respective types of nodes are different from each other.

10. The device in a radio communication system according to claim 9, wherein the circuitry is further configured to:
- determine a power level of the signal transmitted on the transmission resource to be detected, using the power space distribution model, based on the power strengths received at one or more of the at least two of receive positions; and
- judge a type of node corresponding to the node transmitting the signal, according to the determined power level of the signal transmitted on the transmission resource block to be detected.

11. The device in a radio communication system according to claim 8, wherein the circuitry is further configured to periodically update the power space distribution model.

12. The device in a radio communication system according to claim 8, wherein the transmission resource to be detected is unlicensed to the radio communication system, one or more of the at least two receive positions corresponds to one or more users in the radio communication system and the device manages usage of the unlicensed transmission resource in the radio communication system based on judgment of the type of node.

13. The device in a radio communication system according to claim 12, wherein the transmission resource to be detected is licensed to the first type of node.

14. The device in a radio communication system according to claim 8, wherein the first type of node corresponds to a base station or a user equipment, and the circuitry is further configured to judge the type of node corresponding to the node transmitting the signal on the transmission resource as a base station or a user equipment.

15. The device in a radio communication system according to claim 14, wherein the circuitry is further configured to judge whether the transmission resource corresponds to a downlink resource or an uplink resource.

16. A method in a radio communication system, comprising:
- estimating power strengths of a signal received, at a plurality of receive positions on a transmission resource to be detected, from one or more possible transmit positions of a first type of node; and
- making a statistic of a power space distribution of the first type of node, according to a result of the estimation.

17. A method in a radio communication system, comprising:
- obtaining power strengths of a signal received by at least two receive positions on a transmission resource to be detected; and
- judging a type of node corresponding to a node transmitting the signal, using a power space distribution model according to the power strengths of the signal, wherein the power space distribution model reflects a statistic result of estimated power strengths of signal received by at least two of receive positions from one or more possible transmit positions of a first type of node.

18. A non-transitory computer storage medium, comprising computer readable instructions configured to cause a computer to perform a method comprising:
- estimating power strengths of a signal received, at a plurality of receive positions on a transmission resource to be detected, from one or more possible transmit positions of a first type of node; and
- making a statistic of a power space distribution of the first type of node, according to a result of the estimation.

19. A non-transitory computer storage medium, comprising computer readable instructions configured to cause a computer to perform a method comprising:
- obtaining power strengths of a signal received by at least two receive positions on a transmission resource to be detected; and
- judging a type of node corresponding to a node transmitting the signal, using a power space distribution model according to the power strengths of the signal, wherein the power space distribution model reflects a statistic result of estimated power strengths of signal received by at least two of receive positions from one or more possible transmit positions of a first type of node.

* * * * *